United States Patent
Chen et al.

(10) Patent No.: US 8,995,358 B2
(45) Date of Patent: Mar. 31, 2015

(54) FALSE DETECTION REDUCTION DURING MULTI-CARRIER OPERATION

(75) Inventors: Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 12/770,269

(22) Filed: Apr. 29, 2010

(65) Prior Publication Data

US 2011/0110315 A1    May 12, 2011

Related U.S. Application Data

(60) Provisional application No. 61/174,439, filed on Apr. 30, 2009.

(51) Int. Cl.
| | | |
|---|---|---|
| H04W 4/00 | (2009.01) |
| H04L 5/00 | (2006.01) |
| H04L 1/00 | (2006.01) |
| H04B 7/00 | (2006.01) |

(52) U.S. Cl.
CPC .............. *H04L 5/0053* (2013.01); *H04L 1/00* (2013.01)
USPC .......................................... 370/329; 455/509

(58) Field of Classification Search
None
See application file for complete search history.

(56) References Cited

U.S. PATENT DOCUMENTS

| | | | | |
|---|---|---|---|---|
| 2009/0088148 | A1 * | 4/2009 | Chung et al. .................. | 455/423 |
| 2009/0103562 | A1 * | 4/2009 | Frederiksen et al. ......... | 370/468 |
| 2010/0254268 | A1 * | 10/2010 | Kim et al. ..................... | 370/241 |
| 2010/0296467 | A1 * | 11/2010 | Pelletier et al. ............... | 370/329 |
| 2010/0296473 | A1 * | 11/2010 | Kim et al. ..................... | 370/329 |

(Continued)

FOREIGN PATENT DOCUMENTS

| | | |
|---|---|---|
| CN | 101119277 A | 2/2008 |
| JP | 2012525083 A | 10/2012 |

(Continued)

OTHER PUBLICATIONS

Alcatel-Lucent: "Component carrier indication for bandwidth extension in LTE-A" 3GPP Draft; RI-092330, 3rd Generation Partnership Project (SGPP), Mobile Competence Centre ; 650, Route Des Lucioles ; F-06921 Sophia-Antipolis Cedex ; France, No. Los Angeles, USA; Jun. 24, 2009, XP050350855.

(Continued)

*Primary Examiner* — Eunsook Choi
(74) *Attorney, Agent, or Firm* — Paul Kuo

(57) ABSTRACT

Systems and methodologies are described that facilitate reducing false detections of control channels during blind decode when multiple component carriers are configured. A UE can perform blind detection of control channels on a plurality of carriers, wherein each control channel detected can be validated to reduce false detections. In one aspect, a reference carrier can be selected, wherein one or more detected control channels are validated so long as one detected control channel is on the reference carrier. In another aspect, control channel can be bundled such that multiple control channel detections are required for validation. Moreover, dummy control channels can be introduced that provide UE with guidance during blind decoding, as well as provide validation of detections. Further, various combinations of a reference carrier, bundling, and/or a dummy control channel can be utilized.

59 Claims, 17 Drawing Sheets

(56) References Cited

U.S. PATENT DOCUMENTS

2011/0038266 A1* 2/2011 Kim et al. .................. 370/242
2011/0110316 A1 5/2011 Chen et al.

FOREIGN PATENT DOCUMENTS

JP 2012525803 A 10/2012
WO 2010124228 A2 10/2010

OTHER PUBLICATIONS

Catt: "DL Control Channel Scheme for LTE-A" SGPP Draft; RI-091994, 3rd Generation Partnership Project (SGPP), Mobile Competence Centre ; 650, Route Des Lucioles ; F-06921 Sophia-Antipolis Cedex ; France, No. San Francisco, USA; Apr. 28, 2009, XP050339464.
Huawei: "PDCCH design for carrier aggregation" 3GPP Draft; RI-090815, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318672.
International Search Report and Written Opinion—PCT/US2010/033249, International Search Authority—European Patent Office—Aug. 6, 2006.
Motorola: "Control channel structure extension for post Release 8 LTE" 3GPP Draft; RI-091944—Control Channel Structure for LTE-A_FIN, 3rd Generation Partnership Project (SGPP), Mobile Competence Centre ; 650, Route Des Lucioles ; F-06921 Sophia-Antipolis Cedex ; France, No. San Francisco, USA; Apr. 28, 2009, XP050339420.
Qualcomm Europe: "Multicarrier Control for LTE-Advanced" 3GPP Draft; RI-091460, 3rd Generation Partnership Project (SGPP), Mobile Competence Centre ; 650, Route Des Lucioles ; F-06921 Sophia-Antipolis Cedex ; France, No. Seoul, Korea; Mar. 18, 2009, XP050339027.
ZTE: "Downlink Control Signalling Design for LTE-A" SGPP Draft; RI-091429 Downlink Control Signalling Design for LTE-A, 3rd Generation Partnership Project (SGPP), Mobile Competence Centre ; 650, Route Des Lucioles ; F-06921 Sophia-Antipolis Cedex ; France, No. Seoul, Korea; Mar. 17, 2009, XP050339008.
ZTE: "Downlink control structure for LTE-A" 3GPP Draft; RI—090628 Downlink Control Structure for LTE-A, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318509.
Motorola: "Common PDCCH Design for Carrier Aggregation", 3GPP Draft; R1-091327, 3rd Generation Partnership Project (3GPP), Mobile Competence Centre ; 650, Route Des Lucioles ; Sophia-Antipolis Cedex; France, No. Seoul, Korea; Mar. 18, 2009, XP050338925 [retrieved on Mar. 18, 2009].
R1-091364, "Handling DCI formats and blind decoding in LTE-Advanced, Mar. 23-27, 2009".
Tawain Search Report—TW099113995—TIPO—Oct. 30, 2013.

* cited by examiner

FALSE DETECTION REDUCTION DURING MULTI-CARRIER OPERATION

CLAIM OF PRIORITY UNDER 35 U.S.C. §119

The present Application for Patent claims priority to U.S. Provisional Application Ser. No. 61/174,439, filed Apr. 30, 2009, entitled "FALSE DETECTION REDUCTION IN MULTI-CARRIER OPERATION." The aforementioned U.S. Provisional Application is assigned to the assignee hereof and hereby expressly incorporated by reference in their entirety.

BACKGROUND

I. Field

The following description relates generally to wireless communications systems, and more particularly to reducing false detection of control channels in wireless communications systems configured with multiple carriers.

II. Background

Wireless communication systems are widely deployed to provide various types of communication content such as voice and data, Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As wireless communications continue to grow in popularity, consumers demand additional features and greater performance. Such features can require high data rates, which can be difficult to reliably achieve within a limited bandwidth, power constraints, and/or interference constraints of a wireless communication system. One option to increase bandwidth (e.g., widen bandwidth), without a large impact on the complexity of radio equipment (e.g., transmitters and receivers), is to implement carrier aggregation. With carrier aggregation, multiple component carriers can be aggregated or grouped to result in an overall wider system bandwidth. Each component carrier can include a complete downlink and uplink with control and traffic channels. Thus, each component carrier can appear as an individual deployment of a wireless communication technology.

Wireless communication devices (e.g., base stations, mobile terminals, etc.) can be configured to utilize multiple component carriers to send data. For instance, a base station and mobile terminal can be configured to respectively transmit and receive data on downlinks of multiple carriers. In addition, the mobile terminal can be configured to utilize a plurality of uplink frequencies on multiple uplink carriers. Accordingly, higher data rates and greater overall throughput can be achieved without a large impact on equipment complexity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating reduction of false detections of control channels during blind decode when multiple component carriers are configured. A UE can perform blind detection of control channels on a plurality of carriers, wherein each control channel detected can be validated to reduce false detections. In one aspect, a reference carrier can be selected, wherein one or more detected control channels are validated so long as one detected control channel is on the reference carrier. In another aspect, control channels can be bundled such that multiple control channel detections are required for validation. Moreover, dummy control channels can be introduced that provide UE with guidance during blind decoding, as well as provide validation of detections. Further, various combinations of a reference carrier, bundling, and/or a dummy control channel can be utilized.

According to related aspects, a method is described herein that can include performing blind detection on at least one component carrier of a plurality of component carriers, wherein blind detection attempts to detect a control channel on the at least one component carrier. Further, the method can include identifying a number of control channel detections and a component carrier identity respectively associated with each control channel detection. In addition, the method can include determining whether to accept detected control channels based on at least one of the number of control channel detections or the component carrier identity.

Another aspect relates to a wireless communications apparatus. The wireless communication apparatus can include at least one processor configured to perform blind detection on a plurality of carriers, wherein blind detection attempts to decode a plurality of candidate control channels to detect at least one control channel on the plurality of carriers. Further, the at least one processor can be configured to accept detected control channels when at least one of, a control channel is detected on a reference carrier, two or more control channels are detected on non-reference carriers, or a dummy control channel is detected with a non-dummy control channel.

Yet another aspect relates to an apparatus that can include means for attempting blind detection on at least one carrier of a plurality of carriers, wherein blind detection attempts to detect a control channel on the at least one carrier. In addition, the apparatus can include means for identifying valid control channels based on at least one of a number of detected control channels, carriers on which control channels are detected, or types of control channels detected.

Still another aspect relates to a computer program product that can comprise a computer-readable medium. The computer-readable medium can include code for causing at least one computer to implement blind detection on a plurality of carriers, wherein blind detection attempts to decode a plurality of candidate control channels to detect at least one control channel on the plurality of carriers. Further, the computer-readable medium can include code for causing the at least one computer to validate detected control channels when at least one of, a control channel is detected on a reference carrier, two or more control channels are detected on non-reference carriers, or a dummy control channel is detected with a non-dummy control channel.

In accordance with another aspect, an apparatus is described. The apparatus can include a detection module that performs blind detection of control channels on one or more component carriers. In addition, the apparatus can include a validity evaluation module that determines whether detected control channels on the one or more component carriers are valid control channels.

According to other aspects, a method is described that can include scheduling a mobile device on a subframe of one or more component carriers of a plurality of carriers. Further, the method can include generating downlink control information that includes scheduling information. In addition, the method can include incorporating the downlink control information into one or more control channels in the subframe of the one or more component carriers, wherein incorporating the downlink control information comprises implementing at least one of a reference carrier, control channel bundling, or a dummy control channel.

Another aspect relates to a wireless communications aspect comprising at least one processor, wherein the at least one processor can be configured to schedule a mobile device on a subframe of one or more component carriers of a plurality of carriers. The at least one processor can further be configured to generate downlink control information that includes scheduling information. In addition, the at least one processor can be configured to map the downlink control information into one or more control channels in the subframe of the one or more component carriers through implementation of at least one of a reference carrier, control channel bundling, or a dummy control channel.

Yet another aspect relates to an apparatus that can include means for scheduling a mobile device on a subframe of one or more component carriers of a plurality of carriers. The apparatus can further include means for generating downlink control information that includes scheduling information. In addition, the apparatus can include means for incorporating the downlink control information into one or more control channels in the subframe of the one or more component carriers, wherein the means for incorporating the downlink control information comprises means for implementing at least one of a reference carrier, control channel bundling, or a dummy control channel.

Still another aspect relates to a computer program product that can comprise a computer-readable medium. The computer-readable medium can include code for causing at least one computer to schedule a mobile device on a subframe of one or more component carriers of a plurality of carriers. Further, the computer-readable medium can include code for causing the at least one computer to generate downlink control information that includes scheduling information. In addition, the computer-readable medium can include code for causing the at least one computer to map the downlink control information into one or more control channels in the subframe of the one or more component carriers through implementation of at least one of a reference carrier, control channel bundling, or a dummy control channel.

In accordance with another aspect, an apparatus is described that can include a control channel module that integrates scheduling information into a downlink control information format. Further, the apparatus can include a reference carrier module that maps a first downlink control information packet to a reference carrier. In addition, the apparatus can include a dummy generation module that provides a dummy control channel. The apparatus can further include a bundling module that groups two or more control channels onto non-reference carriers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
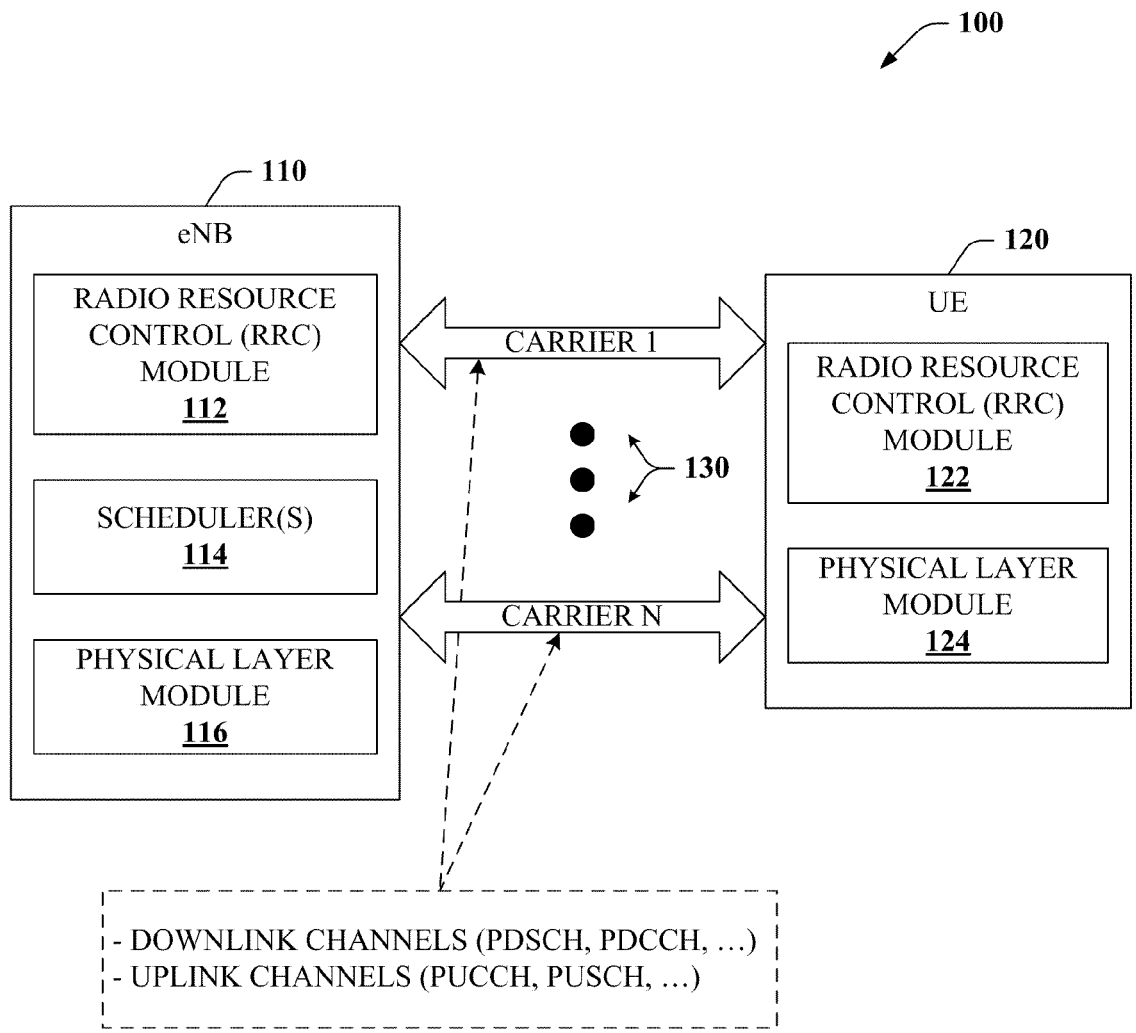
FIG. 1 illustrates an example wireless communication system that facilitates reducing false detections of control channels in multi-carrier configurations in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to drawings, FIG. 1 illustrates an example wireless communication system 100 that facilitates reducing false detections of control channels in multi-carrier configurations in accordance with various aspects. Wireless communication system 100 includes an eNodeB (eNB) 110 and user equipment (UE) 120 that communicate with one another over a wireless link. In one example, eNB 110 can be an access point, such as a macrocell access point, femtocell or picocell access point, a NodeB, an eNodeB, a base station, a mobile base station, a portion thereof, and/or substantially any device or apparatus that provides access for UEs to a wireless communication network. While only one UE 120 and eNB 110 are illustrated in FIG. 1, it should be appreciated that system 100 can include any number of UEs and/or eNBs. In accordance with an aspect, eNB 110 can transmit information to UE 120 over a forward link or downlink channel and UE 120 can transmit information to eNB 110 over a reverse link or uplink channel. It should be appreciated that system 100 can operate in an WCDMA wireless network, an OFDMA wireless network, a CDMA network, a 3GPP LTE or LTE-A wireless network, a 3GPP2 CDMA2000 network, an EV-DO network, a WiMAX network, a HSPA network, etc.

In an aspect, eNB 110 and UE 120 can be configured to employ multiple component carriers. For example, eNB 110 and UE 120 can communicate via a plurality of component carriers 130, denoted carrier 1 through carrier N, where N is an integer greater than or equal to one. While two carriers are depicted in FIG. 1, it is to be appreciated that eNB 110 and UE 120 can be configured to operate with a single carrier, two carriers, three carriers, and so on. Each carrier of carriers 130 can encapsulate a complete radio interface. For instance, each of carriers 130 can respectively include an LTE or LTE-A radio interface, such that carriers 130 respectively include a plurality of downlink and uplink logical, transport, and physical channels, such, but not limited to, a physical downlink shared channel (PDSCH), a physical downlink control channel (PDCCH), a physical uplink shared channel (PUSCH), a physical uplink control channel (PUCCH), a physical broadcast channel (PBCH), and the like. Thus, UE 120 can receive complete wireless communication services via one of carriers 130. In addition, greater data rates can be achieved through utilization of two or more of carriers 130. In another aspect, one of carriers 130 can be designated an anchor carrier of UE 120. While each component carrier can include a complete radio interface, designating an anchor can reduce system overhead. For instance, each carrier can include control signaling to support operation of that carrier, while the anchor carrier can carry additional signaling (e.g., paging signals, synchronization signals, system broadcasts, etc.) that support the entire system. It is to be appreciated that the anchor carrier can be cell-specific (e.g., all UEs served by eNB 110 designate the same carrier as anchor) or UE-specific (e.g., each UE designates disparate carriers as anchor). Moreover, it is to be appreciated that two or more anchor carriers can be designated for each UE. In one example, carriers 130 can be an aggregation of LTE Release 8 carriers, wherein a legacy UE can utilize a single component carrier (e.g., the anchor carrier or other carrier), while an advanced UE can employ one or more component carries.

In a single-carrier configuration, similar to LTE Release 8, eNB 110 can transmit a control channel, such as PDCCH, to UE 120. The control channel can include downlink control information such as downlink scheduling assignments, uplink scheduling grants, power control commands, etc. The control channel can include control signaling for UE 120, while other control channels can be transmitted for other UEs or groups of UEs (not shown). Accordingly, multiple control channels can be transmitted at a given time. Each control information payload of the controls channels can be concatenated with a cyclic redundancy check (CRC) scrambled by an identifier of a UE, for which the control information is intended. For example, eNB 110 can generate a CRC based upon a payload of the control channel (e.g., the control information) and the CRC can be scrambled by an identifier associated with UE 120 and attach the CRC to control information included in a control channel intended for UE 120. Upon reception, UE 120 can check the CRC of a control channel against its identity to confirm whether the control channel is valid.

Figure 2:
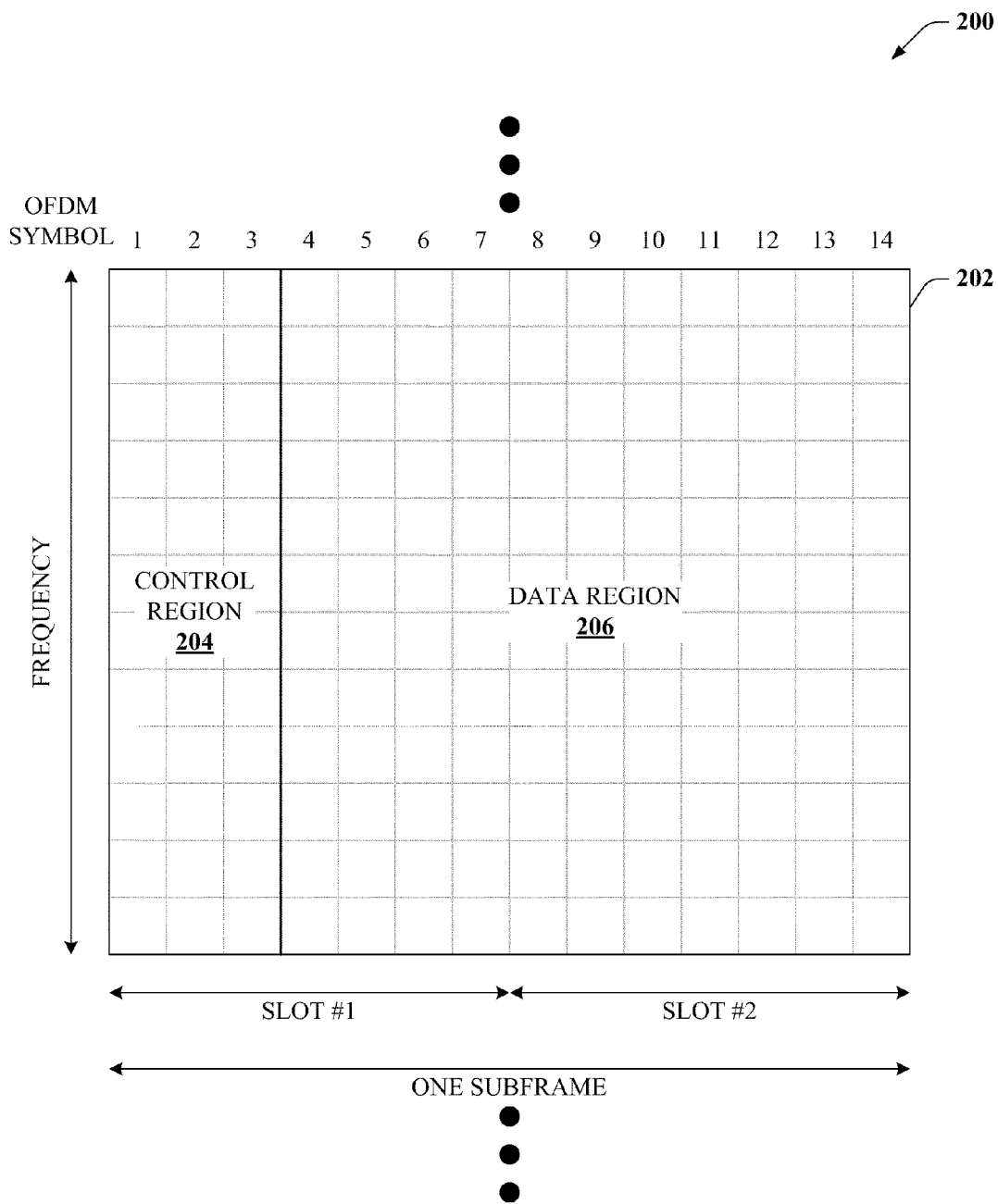
FIG. 2 is an illustration of an example resource diagram that depicts physical resources of a wireless communications system in accordance with various aspects.

Turning briefly to FIG. 2, a portion 200 of a wireless communications system bandwidth for a downlink is depicted. The portion 200 of bandwidth can include a plurality of resource blocks, such as resource block 202. Resource block 202 can span one subframe or two slots in the time dimensions and twelve subcarriers in the frequency dimension. Depending on a size of a cyclic prefix, resource block 202 can include up to 14 orthogonal frequency division multiplexing (OFDM) symbols. A slot can include seven symbols each. One OFDM symbol at a particular subcarrier is considered a resource element.

As illustrated in FIG. 2, resource block 202 can be divided into a control region 204 and a data region 206. The control region 204 include resource elements utilized to carry control information in a subframe and can span 1, 2, or 3 OFDM symbols (e.g., for large system bandwidths) or span 2, 3, or 4 OFDM symbols (e.g., for small bandwidths having 10 or fewer resource blocks) as specified through a physical control format indicator channel (PCFICH). In an aspect, control channels (e.g., PDCCHs) can be mapped to the control region 204 of resource block 202 (or any other resource blocks) to be transmitted to one or more UEs. Resource elements included in data region 206 can be utilized by data channels, such as PDSCHs, to carry downlink user data.

In an aspect, a control channel or PDCCH can be constructed from one or more control channel elements (CCEs). A CCE can comprise a plurality of resource elements. For example, one CCE can include a set of 36 resource elements;

however, it is to be appreciated that CCEs of different sizes can be employed. The number of CCEs per control channel depends upon an aggregation level. In an aspect, a set of available aggregation levels can be restricted. For instance, possible aggregation levels can be 1, 2, 4, or 8 CCEs per control channel. However, it is to be appreciated that other aggregation levels can be utilized.

Figure 3:
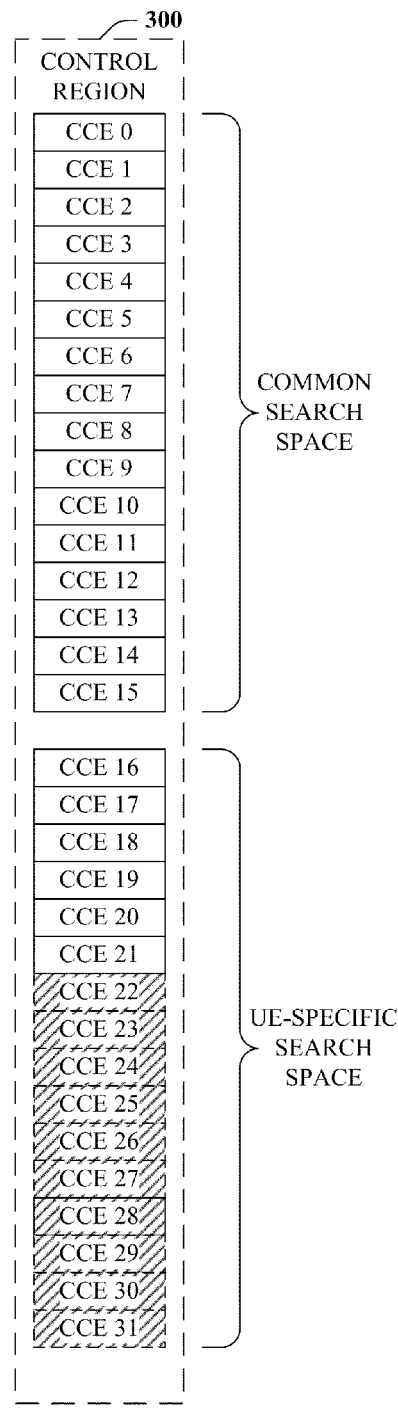
FIG. 3 is an illustration of an example control region of physical resources of a wireless communications system in accordance with various aspects.

A format of a control channel can vary and is generally not known prior to reception of a subframe. Accordingly, UEs blindly detect formats of control channels. In an example, UEs attempt to decode various grouping of CCEs to discover control channel information. To reduce UE complexity, search spaces can be defined. Turning to FIG. 3, a control region 300 is depicted. It is to be appreciated that control region 300 can be similar to control region 204 of resource block 202. However, in an aspect, control region 300 can span an entire system bandwidth of a carrier. Control region 300 includes a plurality of CCEs, which can be aggregated to form control channels. While FIG. 3, depicts control region 300 having 32 CCEs (indexed from CCE 0 to CCE 31), it is to be appreciated that a different number of CCEs can be available for control channels. In an example, the number of CCEs available can depend on a size of the control region (e.g., 1, 2, or 3 symbols), cell bandwidth, number of downlink antenna ports, amount of resource occupied by a physical hybrid-ARQ indicator channel (PHICH), etc.

Control region 300 can be partitioned into a common search space and a UE-specific search space. The common search space is monitored by every UE within a cell. The UE-specific search space is monitored by a single UE and, accordingly, multiple UE-specific search spaces can be defined based upon a number of UEs within a cell. While shown as distinct portions of control 300, the common search space and the UE-specific search space can overlap. Moreover, multiple, overlapping UE-specific search spaces can be configured per UE, wherein each search space is associated with a different aggregation level. While FIG. 3 depicts the common search space starting and CCE 0 and the UE-specific search space at CCE 16, it is to be appreciated that starting indices of the respective search spaces can another CCE index.

Figure 4:
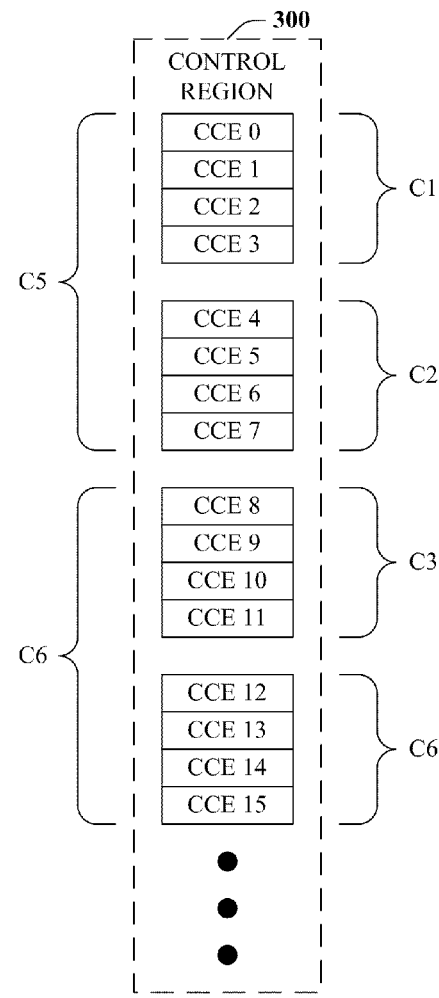
FIG. 4 is an illustration of an example control region of physical resources of a wireless communications system in accordance with various aspects.

FIG. 4 depicts control channel candidates that UEs attempt to decode within in the common search space. Within the common search space, two aggregation levels are possible, aggregation level 4 and aggregation level 8. Accordingly, within the common search space, control channels can include 4 CCEs and/or 8 CCEs. As the common search space can include 16 CCEs, the common search space includes 2 candidates of 8 CCEs each (e.g., C5 and C6) and 4 candidates of 4 CCEs each (e.g., C1 through C4).

Figure 5:
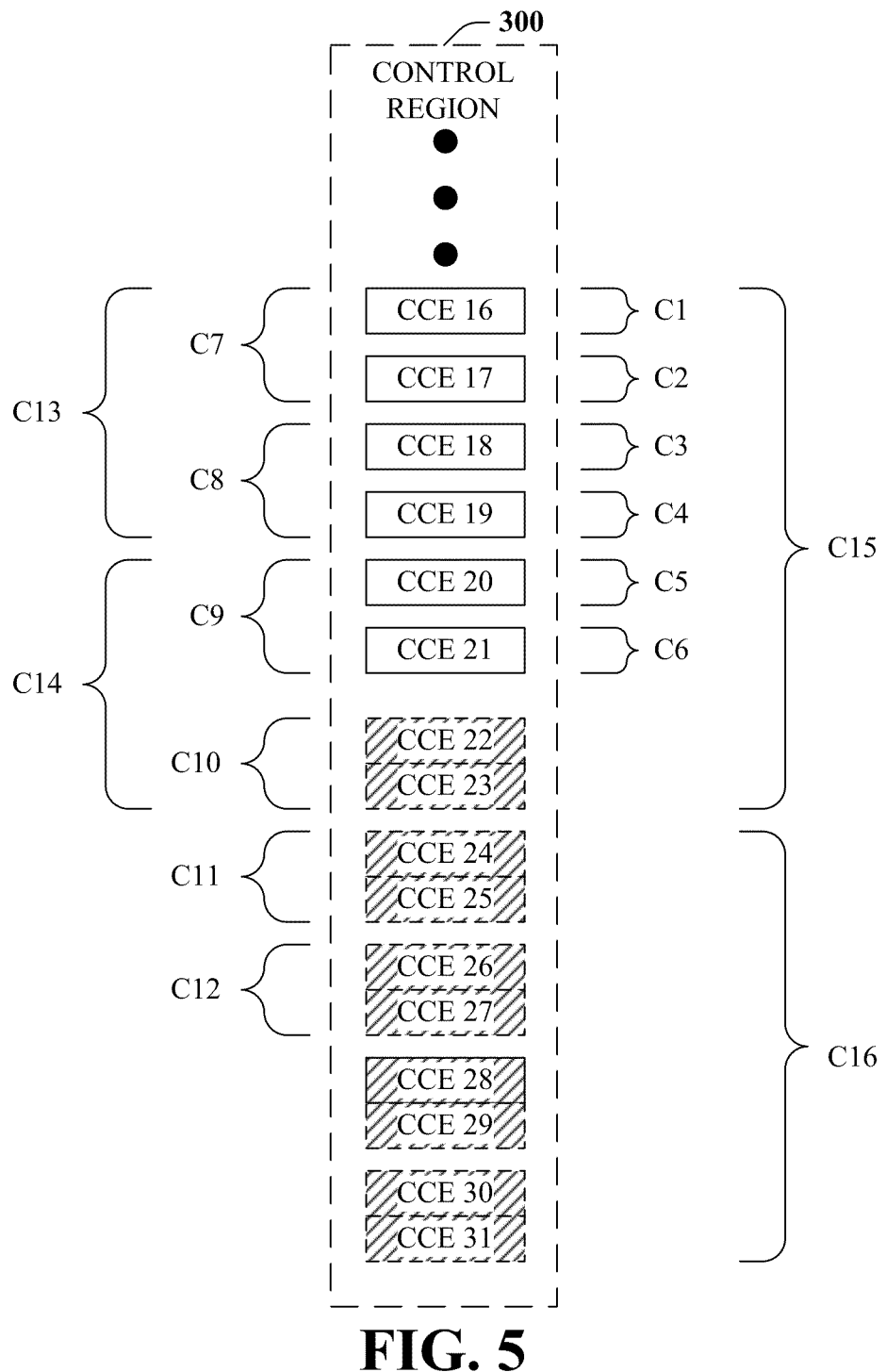
FIG. 5 is an illustration of an example control region of physical resources of a wireless communications system in accordance with various aspects.

FIG. 5 illustrates control channel candidates within UE-specific search spaces. With UE-specific search spaces, four aggregation levels are available, namely, aggregation levels 1, 2, 4, and 8. For each aggregation levels, a UE can be configured with different search spaces having different sizes. Though each search space is depicted, in FIG. 5, as sharing the same start CCE index, it is to be appreciated that different starting indices can be associated with different aggregation levels (e.g., search spaces. In addition, it is to be appreciated that the starting index of a search space can overlap into the common search space described above with reference to FIG. 4. For aggregation level 1, a search space of 6 CCEs can be configured, resulting in 6 candidate control channels (e.g., C1 through C6). For aggregation level 2, a search space of 12 CCEs can be configured. Within this search space, 6 candidates (C7 through C12) having 2 CCEs each can be decoded. For aggregation levels 4 and 8, search spaces of 8 and 16, respectively, can be configured. Within these search spaces, two candidates each (e.g., C13 and C14 for aggregation level 4, C15 and C16 for aggregation level 8) can be blindly decoded.

As shown in FIG. 4 and FIG. 5, there are 22 candidate control channels that a UE can attempt to decode when searching for a control channel intended thereto, in accordance with one example design. UEs, however, can be configured to utilize a particular downlink and/or uplink transmission mode, wherein each transmission mode can be associated with two control channel formats of varying sizes. Accordingly, UEs attempt to decode a candidate control channel twice, each time attempting to decode the candidate in accordance with one of the control channel formats associated with configured transmission modes. In an example, UE 120 can attempt 44 blind detections per subframe, 22 detections per control channel format configured. In another aspect, UE 120 can be configured to operate with more than one transmission mode and, thus, monitor additional control channel formats. Accordingly, the number of detections can increase linearly as additional transmission modes are configured.

In an aspect, UE 120 can be assigned multiple identities (e.g., radio network temporary identifiers (RNTIs)) and a control channel can be protected by a 16-bit CRC. Accordingly, a false detection probability (e.g., a probability that UE 120 detects a control channel intended for another user) for UE 120 in one subframe is approximately $44*2/2^{16}$ or 0.13% (approximately $1/750$). As discussed above, UE 120 can be configured to employ multiple component carriers. In an example, UE 120 can monitor 5 component carriers. Under individual control signaling wherein each carrier provides control signaling for users scheduled on that carrier, the number of blind control channel detections can increase to 220, for instance. With the increase in blind detections, the false detection probability can also increase to 0.67%. The false alarm probability can be reduced through implementation of a pruning operation by UE 120. For example, zero-padding, if applicable, can be utilized. In another example, UE 120 can eliminate control channels with invalid resource allocation sizes. It is to be appreciated that other operations can be performed as well to further reduce false alarms by reducing a number of blind detections and/or otherwise eliminating candidates via other characteristics.

More particularly, consider a system with K actives users supporting a total of 5 component carriers. On average, each active users monitors M component carriers and attempts to decode control channels every L subframes. Thus, in a given subframe, an average number of UEs attempting control channel detection can be approximately K/L. Moreover, a probability, p, can be defined that indicates a probability a UE is scheduling with a component carrier. In an example with 25 UEs per subframe available for scheduling and a probability, p, of 0.25, there is on average 6.25 UEs scheduled per subframe. Accordingly, each subframe, the number of false detections, per component carrier, can be given by:

$$((1-p)*M*K)/(5*750*L)$$

Pursuant to a specific example where K=625, L=5, M=3, and p=0.25, there are, on average, 0.025 false detections per subframe per carrier, which corresponds to 0.83% of carrier bandwidth blocked, on average. As a number of component carriers monitored, M, increases, the number of false detections as well as percentage of blocked bandwidth also increases.

Continuing with FIG. 1, system 100 can facilitate reduction of false detections when multiple component carriers are configured. eNB 110 can include a radio resource control (RRC) module 112, a scheduler(s) 114, and a physical layer module 116. The RRC module 112 can implement various functions of an RRC protocol layer. For example, the RRC module 112 can control broadcasting of system information, connection control, paging, establishment and configuration of connections, quality of service (QoS) control, radio link failure recovery, and/or other similar functions. In addition, the RRC module 112 can activate/deactivate component carriers that UE 120 monitors, establish configuration parameters that facilitate false detection reduction, and/or select a mode of false detection reduction.

Scheduler 114 can allocate resources on a link (e.g., downlink or uplink) to UE 120 (and/or any other UEs (not shown) served by eNB 110). The scheduler 114 can select resource blocks on one or more subframes intended to carry data associated with UE 120. In an aspect, carriers 130 can be individually scheduled such that eNB 110 includes a plurality of schedulers 114, each associated with a particular carrier. In another aspect, carriers 130 can be jointly scheduled by scheduler 114.

Physical layer module 116 can implement physical layer functions of eNB 110. For instance, physical layer module 116 can attach a CRC to a data packet, code the data packet, modulate the coded data packet onto a signal, perform antenna mapping, and/or mapping signals to resource elements for transmission over a wireless link. Physical layer module 116 can provide such coding, modulating, and transmitting functions to higher layers (e.g., medium access control, radio link control, etc.) in the form of transport channels. Data packets (e.g., internet protocol (IP) packets) converted into one or more transport blocks can be added to a transport channel for processing and transmission by physical layer module 116.

In addition, physical layer module 116 can manage physical signals (e.g., reference signals) as well as control signaling (e.g., downlink control information, etc.). In an example, physical layer module 116 can generate control information, which includes scheduling information provided by scheduler 114. Physical layer module 116 can attach a CRC scrambled by a RNTI of UE 120 or another UE for which the control information is intended, and code the control information with CRC attached. The coded control information can be aggregated into CCEs, modulated, and transmitted on one of carriers 130.

UE 120 can include an RRC module 122 and a physical layer module 124. RRC module 122 can receive a RRC signaling and/or configuration message from eNB 110. The configuration message can include configuration parameters as well as commands that activate/deactivate component carriers, select a mode of false detection reduction, etc. Physical layer module 124 can demodulate and decode signals received via a wireless link. In addition, physical layer module 124 can perform blind detection of control channels in a subframe. For example, physical layer module 124, upon receiving a subframe, can attempt to decode control channel candidates in the common search space and one or more UE-specific search spaces as discussed supra. In particular, physical layer module 124 attempts to decode a candidate control channel and checks the CRC with an identity of UE 120. If a match occurs, then UE 120 assumes it is scheduled and that the detected control channel contains necessary control information. Given the number of candidates that physical layer module 124 attempts to detect, a probability exists of a false detection, wherein UE 120 detects a control channel intended for another user. As more component carriers are activated and configured, the probability of false detection can increase. In one example, each component carrier of carrier 130 can maintain backward compatibility with single-carrier legacy UEs. Accordingly, control channel structure, searching, and blind detection can follow legacy designs.

To reduce false detections without change to downlink control information or limiting search spaces and aggregation levels, eNB 110 and UE 120 can employ a reference carrier when multiple carriers are configured therebetween. UE 120, configured with multiple component carriers 130, can be designated a reference carrier. The reference carrier can be semi-static and configured via RRC modules 112 and 122. In another aspect, the reference carrier can be dynamically selected. When receiving a downlink subframe, physical layer module 124 of UE 120 can initiate blind detection on the reference carrier. If a control channel is detected, physical layer module 124 can continue blind detection on remaining carriers. If a control channel is not detected on the reference carrier, UE 120 assumes it is not scheduled and halts blind detection. Accordingly, scheduler 114 and physical layer module 116, in order to schedule UE 120, coordinate such that control information is included at least on the reference carrier associated with UE 120.

In another aspect, eNB 110 and UE 120 can utilize control channel bundling to reduce false detections. As discussed infra, control channel bundling can be employed in concert with reference carriers and/or other suitable false detection reduction schemes. UE 120 can perform blind detection on one or more carriers when a subframe is received. When UE 120 detects a single control channel, UE 120 assumes it is not scheduled on the subframe. However, UE 120 can accept any detected control channels when two or more channels are detected. In another example, control channel bundling can compliment reference carrier operation such that a single control channel is accepted as valid when the control channel is on the reference carrier. Accordingly, scheduler 114 schedules UE 120 on at least two carriers in a subframe which contains data for UE 120.

Another aspect that can be employed to reduce false detections relates to dummy control channels. A dummy control channel can be a control channel that does not carry scheduling information. The dummy control channel can be utilized as a reference or a validation mechanism to indicate to UE 120 that control detections are valid. Under this approach, physical layer module 124 of UE 120 can attempt to decode control channels in a subframe. Particularly, physical layer module 124 can evaluate control channel candidates in the common and/or UE-specific search spaces in order to detect a dummy control channel. If the dummy control channel is not detected, UE 120 assumes it is not scheduled on the subframe. However, when the dummy control channel is detected, UE 120 assumes it is scheduled and continues with blind detection to discover a valid control channel on one of carriers 130. In accordance with an example, eNB 110 can include a dummy control channel along with a valid control channel in a subframe whenever scheduler 114 schedules UE 120 on the subframe.

As discussed below, eNB 110 and UE 120 can employ a combination of reference carriers, control channel bundling, and/or dummy control channels to reduce false detections. Moreover, while the above false detection reduction mechanisms have been describe in connection with LTE-A, it is to be appreciate that 3GPP LTE, UMTS, CDMA, CDMA2000, HSPA, WCDMA, WiMAX, WiFi, and/or other technologies can utilize concepts described herein to improve control channel reception.

Figure 6:
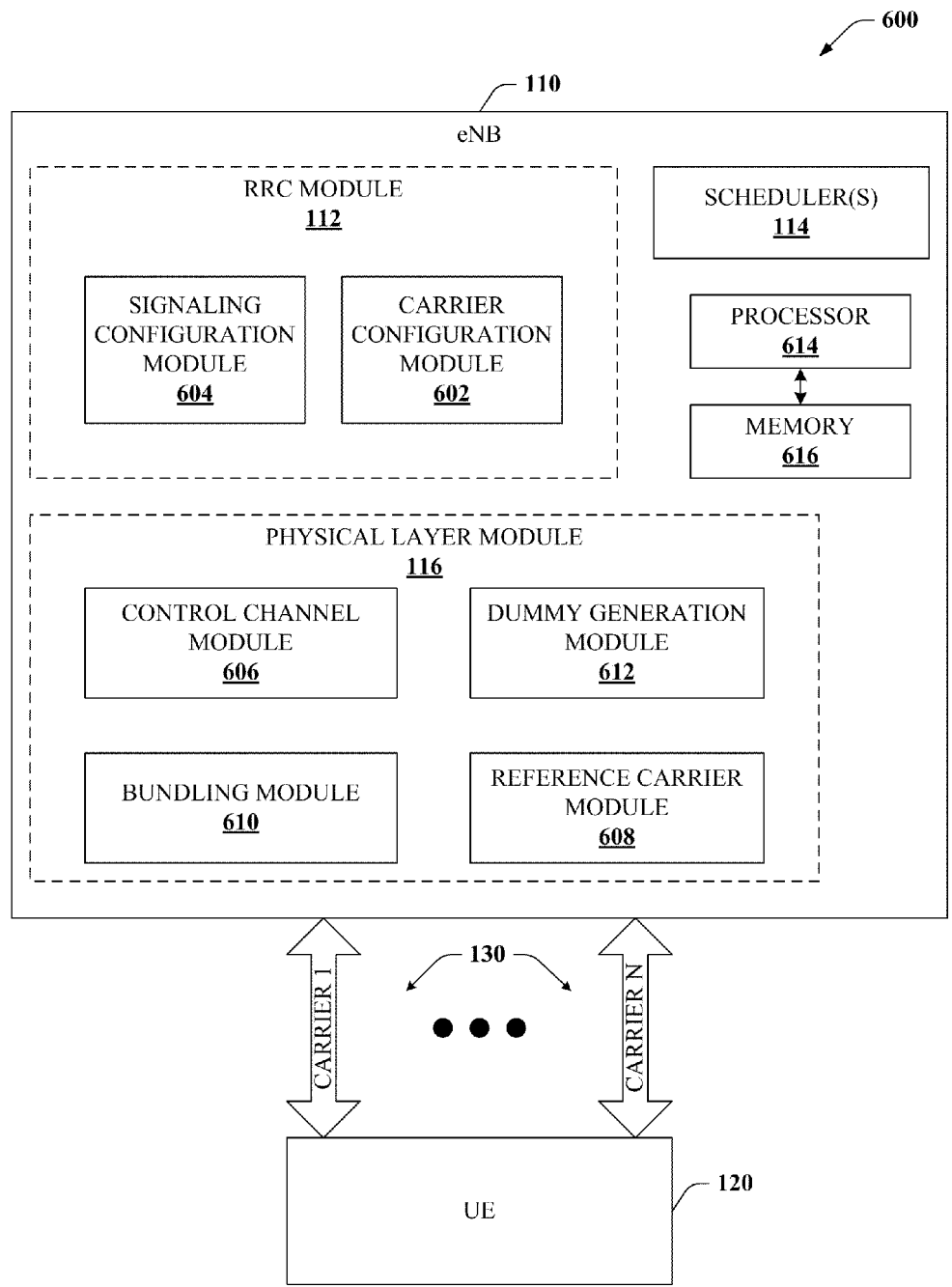
FIG. 6 is an illustration of an example system that facilitates configuration and transmission of control channels in multi-carrier configurations according to various aspects.

Referring to FIG. 6, a system 600 is illustrated that facilitates configuration and transmission of control channels in multi-carrier configurations according to various aspects. System 600 can include an eNB 110 and UE 120, which communicate via a plurality of component carriers 130. eNB 110 can configure and transmit control channels intended for UE 120 on one or more of carriers 130, such that false control channel detections by UE 120 are reduced.

eNB 110 can include an RRC module 112 which configures and control lower layers such as a physical layer implemented by physical layer module 116. eNB 110 can further include a scheduler 114 that allocated resources to UE 120 on one or more subframes of one or more of carriers 130. RRC module 112 can include a carrier configuration module 602 that activates and/or deactivates component carriers monitored by UE 120. In addition, carrier configuration module 602 can designate a component carrier of the plurality of carriers 130 as a reference carrier, employable in false detection reduction mechanisms. The reference carrier can be semi-statically configured via RRC configuration messages. The reference carrier can be cell-specific (e.g., all UEs within a cell employ the same reference carrier) or UE-specific (e.g., each UE can employ different reference carriers). Carrier configuration module 602 can select the reference carrier for UE 120 through a variety of techniques. For instance, a hashing function can be employed that selects a carrier to designate as a reference carrier, wherein the hashing function can identify the reference carrier based upon a UE identity (e.g., RNTI), a cell identifier, a subframe number, a system frame number, a hybrid-ARQ process number, etc. In another example, carrier configuration module 602 deterministically rotates the reference carrier after a predetermined amount of time and/or a predetermined number of subframes. For instance, given C component carriers monitored by UE 120, each carrier can be the reference carrier every C subframes. As discussed infra, the reference carrier can also be dynamically selected by UE 120 and, accordingly, established by UE 120 and eNB 110 without the need for RRC signaling.

RRC module 112 can further include a signaling configuration module 602 that configures and controls downlink control signaling of physical layer module 116. In an aspect, signaling configuration module 602 can select a mode of false detection reduction (e.g., reference carrier, dummy control channel, control channel bundling, or a combination thereof). According to an example, the mode of false detection reduction can be cell-specific such that any UEs served by eNB 110 utilize the same mode. However, it is to be appreciated that the mode can be UE-specific such that each UE can be configured to employ disparate modes. UE-specific configuration can be based upon a UE category, UE priority class, a number of carriers configured for a UE, and the like. In an example, a UE having one or two carriers configured can utilize different reduction mechanisms than a UE having 5 component carriers configured.

Scheduler 114 can schedule UE 120 on a subframe in accordance with the signaling configuration constraints generated by signaling configuration module 604. In addition, physical layer module 116 can generate control information and multiplex control information into one or more control channels on the subframe based upon at least one configuration parameter established by signaling configuration module 604. Physical layer module 116 can include a control channel module 606 that integrates scheduling information (e.g., downlink and/or uplink scheduling assignments) and/or other control information into a downlink control information (DCI) format. In addition, the control channel module 606 can attach a CRC to the DCI packet. The CRC can be scrambled by an identity (e.g, RNTI) of UE 120, for which the DCI packet is intended. Further, the control channel module 606 can map the DCI packet to one or more CCEs in accordance with an aggregation level of the subframe.

To support reference carrier operation, physical layer module 116 can include a reference carrier module 608, that maps at least one DCI packet intended for UE 120 to a control carrier on a reference carrier configured. As discussed supra, when reference carriers are employed, a control channel should be mapped to the reference carrier in order to ensure UE 120 detects and accepts the control channel. Additional control channels can be mapped to other carriers so long as a first control channel is transmitted on the reference carrier.

To support bundling, physical layer module 116 can include a bundling module 610. The bundling module ensures that control channels for UE 120 are grouped into sets of two or more for a subframe of a plurality of carriers. In another aspect, physical layer module 116 can include a dummy generation module 612 that provides dummy control channels, which do not include scheduling information but provide a reference or validation to UE 120. The dummy control channel can be transmitted from any component carrier and can coexist on a carrier where an actual control channel is sent. The dummy control channel can be differentiated for downlink and uplink transmissions, such that the dummy control channel for downlink differs from the dummy control channel for uplink. In an aspect, the dummy control channel generated by dummy generation module 612 can be UE-specific (e.g., utilized by a single UE). For example, the dummy control channel can have a certain CCE level (e.g., CCE index), a size matching a DCI format, and/or a fixed bit pattern. The dummy control channel can also include a payload specifying information which can provide guidance to UE 120. In one example, the payload can include a total number of carriers on which UE 120 is scheduled. The dummy control channel can also be cell-specific (e.g., utilized by several UEs), having a certain CCE level, size, and/or encoded with a common RNTI. A payload of a common dummy control channel can specify a set of UEs scheduled on a subframe with one or more carriers. For example, the payload can include a bitmap wherein each bit location corresponds to a particular UE of the cell and the bit value indicates whether or not the particular UE is scheduled on at least one carrier. Configuration information, such as activation/deactivation of dummy control channels, whether dummy control channels are UE-specific or cell-specific, locations within a control region of a dummy control channel, and/or a bit location of a bit map (e.g., for cell-specific dummy control channels), can be provided by signaling configuration module 604 and signaled to UE 120 via RRC signaling, layer 2 signaling, layer 1 signaling, a medium access control (MAC) payload, etc.

As further illustrated in system 600, eNB 110 can include a processor 614 and/or a memory 616, which can be utilized to implement some or all the functionality of RRC module 112, signaling configuration module 604, carrier configuration module 602, physical layer module 116, control channel module 606, reference carrier module 608, bundling module 610, dummy generation module 612, and/or other functionality of eNB 110.

Figure 7:
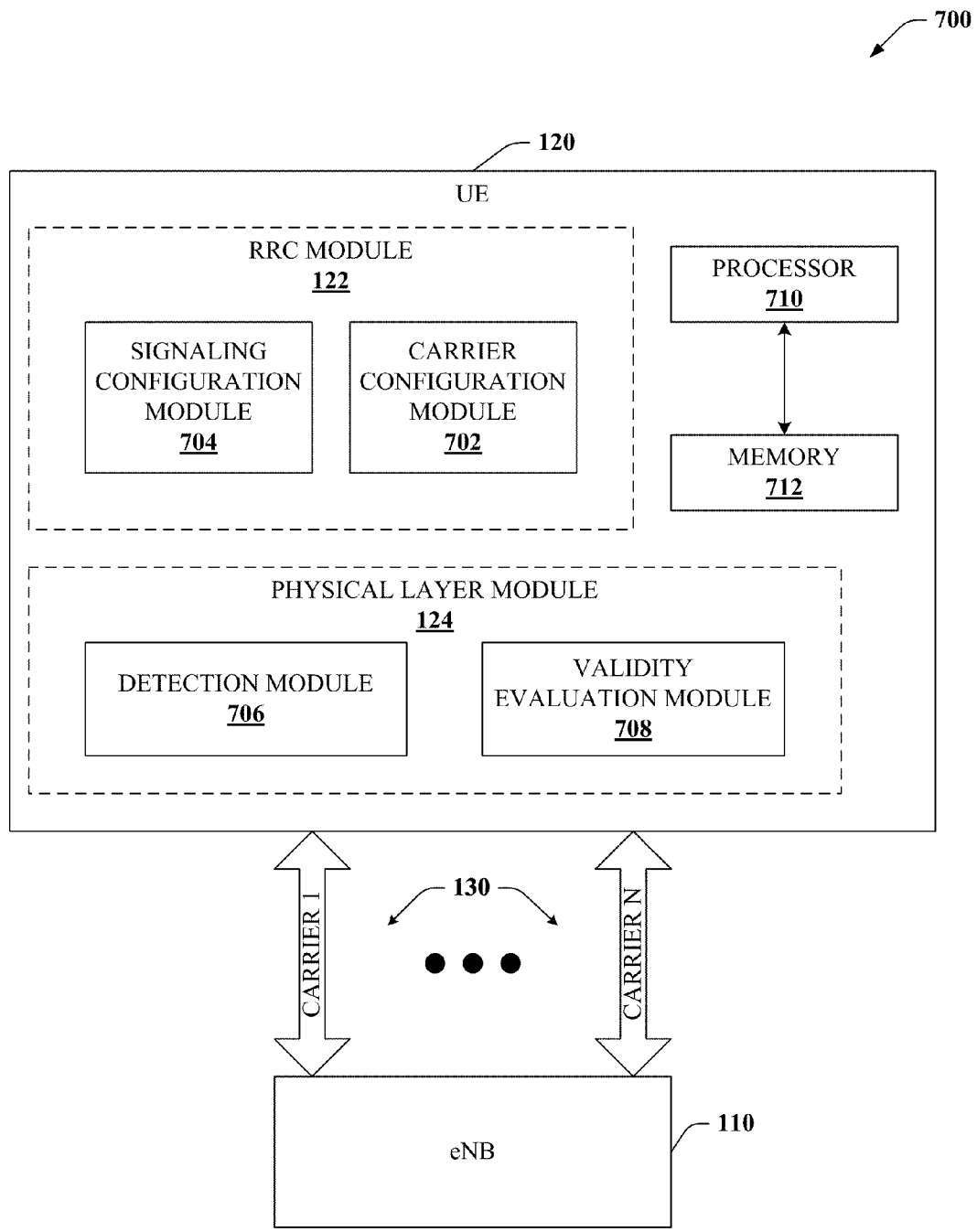
FIG. 7 is an illustration of an example system that facilitates detection of control channel in a multi-carrier configuration in accordance with various aspects.

Turning now to FIG. 7, a system 700 that facilitates detection of control channels in multi-carrier configuration in accordance with various aspects is depicted. System 700 can include an eNB 110 and UE 120, which communicate via a plurality of component carriers 130. eNB 110 can configure and transmit control channels intended for UE 120 on one or more of carriers 130 and UE 120 can perform blind detection of control channels on the one or more carriers 130 in accordance with one or more mechanisms such that false control channel detections by UE 120 are reduced.

UE 120 can include an RRC module 122 which configures and control lower layers, such as a physical layer implemented by physical layer module 124. RRC module 122 can include a carrier configuration module 702 that activates and/or deactivates component carriers monitored based upon layer 3 or RRC signaling from eNB 110. In addition, carrier configuration module 702 can designate a component carrier of the plurality of carriers 130 as a reference carrier, employable in false detection reduction mechanisms. The reference carrier can be semi-statically selected by eNB 110 via RRC configuration messages and can be cell-specific or UE-specific. In another example, carrier configuration module 702 can dynamically designate the reference carrier from among carrier 130. For instance, carrier configuration module 702 can employ a hashing function that selects a reference carrier based upon a UE identity (e.g., RNTI), a cell ID, a subframe number, a system frame number, a hybrid ARQ process number, etc. In another example, carrier configuration module 702 can deterministically rotate the reference carrier. For instance, given C component carrier monitored by UE 120, each carrier can be designated as the reference carrier every C subframes.

RRC module 122 can further include a signaling configuration module 704 that receives RRC configuration messages and configures and/or controls physical layer module 124 accordingly. In particular, signaling configuration module 704 obtains configuration information related to downlink control information signaling and blind detection of control channels in a subframe. For instance, the configuration information can specify a mode of false detection reduction (e.g., reference carriers, bundling, dummy control channels, or a combination thereof).

Physical layer module 124 can include a detection module 706 that performs blind detection of control channels on a particular subframe of one or more carriers 130. In an example, detection module 706 can cycle through candidate control channels, as described supra, on each carrier. For each candidate, detection module 706 can decode the candidate and check a CRC therewith against an identity of UE 120. If the CRC check passes, detection module 706 registers a control channel detection.

Physical layer module 124 can further include a validity evaluation module 708 that validates control channel detections registered by the detection module 706. Accepting of detected control channels by validity evaluation module 708 accepts can be in accordance with a mode of false detection reduction. In one example, the configured mode of false detection reduction can be a reference carrier mechanism. Under this scheme, a reference carrier is designated. Validity evaluation module 708 accepts all control channel detections so long as at least one of the detections is associated with the reference carrier.

In another example, control channel bundling can be configured. With control channel bundling, validity evaluation module 708 accepts detected control channels when two or more control channels are detected on one or more carriers. It is to be appreciated that bundling can complement reference carrier operation. For instance, validity evaluation module 708 can validate control channel detections when at least one of the detections is on the reference carrier and/or two or more detections are associated with non-reference carriers.

According to another aspect, dummy control channels can be configured. Under this reduction mode, validity evaluation module 708 accepts controls channels that are detected, when a dummy control channel is also detected. When dummy control channel complement a reference carrier, validity evaluation module 708 validates detections when a control channel is decoded on the reference carrier, or a control channel is decoded on a non-reference carrier and a dummy control channel is also found on a carrier. In a configuration where dummy control channels are employed in concert with bundling, validity evaluation module 708 accepts detected control channels when two or more control channels, including the dummy control channel, have been discovered. In another example, reference carriers, bundling, and dummy control channels can be utilized together. Pursuant to this example, validity evaluation module 708 validates detected control channel when at least one control channel is found on the reference carrier, or two or more control channels (including a dummy control channel) are detected on non-reference carriers.

As further illustrated in system 700, UE 120 can include a processor 710 and/or a memory 712, which can be utilized to implement some or all the functionality of RRC module 122, signaling configuration module 704, carrier configuration module 702, physical layer module 124, detection module 706, validity evaluation module 708, and/or other functionality of UE 120.

Referring to FIGS. 8-13, methodologies are described related to facilitating reduction of false detections of control channels in multi-carrier configurations. The methodologies can be implemented by systems 100, 600, and/or 700 described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 8:
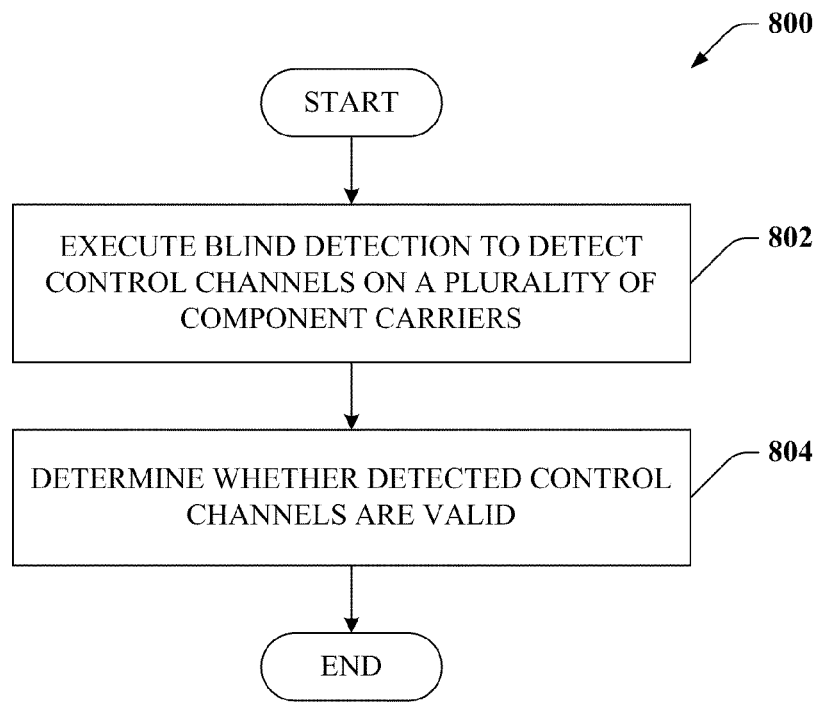
FIG. 8 is an illustration of an example methodology for detecting valid control channels in accordance with various aspects.

Turning to FIG. 8, illustrated is a method 800 for detecting valid control channels in accordance with various aspects. Method 800 can be employed, for example, by a mobile device to determine whether it is scheduled in a subframe on one or more component carriers. At reference numeral 802, blind detection can be executed to detect one or more control channels on a plurality of component carriers. While executing blind detection, a group of control channel candidates in a common search space and/or a UE-specific search space can be decoded. Decoded candidates for which a CRC check matches can be considered control channel detections. At reference numeral 804, detected controls channels can be determined to be valid or invalided. In an example, validation of detected control channels can be based upon a mode of false detection reduction configured. For instance, detected control channels can be deemed valid when at least one control channel is detected on a reference carrier. In another aspect, detected control channels can be accepted when two or more controls have been detected. Moreover, validation can be based upon a dummy control channel, wherein control channels are accepted when a dummy control channel is also detected. It is to be appreciated that a combination of the above described approaches can be employed to determine whether detected control channels are valid.

Figure 9:
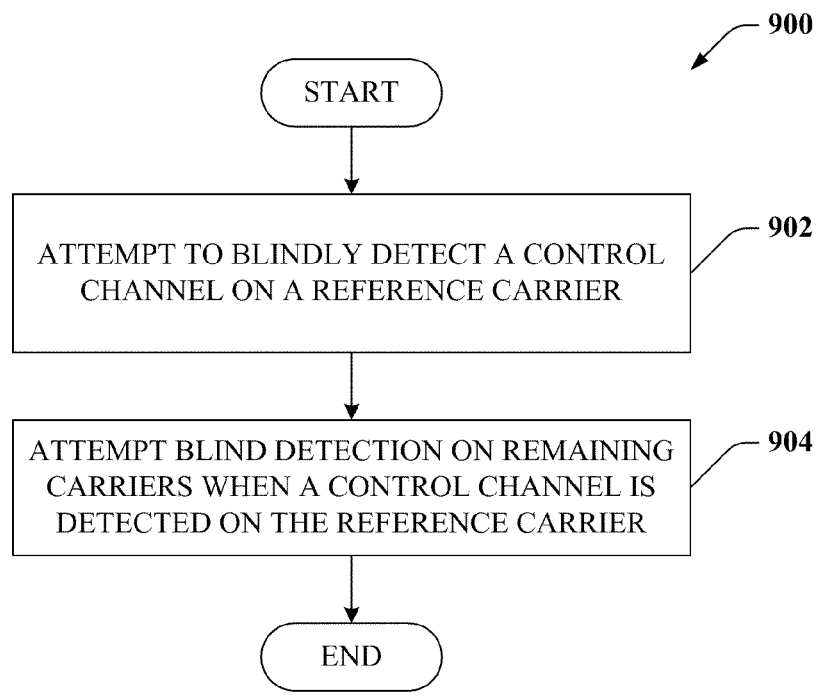
FIG. 9 is an illustration of an example methodology for identifying valid control channels based upon a reference carrier according to various aspects.

Referring now to FIG. 9, a method 900 is depicted that facilitates for identifying valid control channels based upon a reference carrier according to various aspects. Method 900 can be employed, for instance, by a mobile device configured to utilize a reference carrier to reduce false detections. Method 900 can commence at reference numeral 902 where an attempt to blindly detect a control channel on a reference carrier is made. At reference numeral 904, blind detection on remaining carriers (e.g., non-reference carriers) can be attempted when a first control channel is detected on the reference carrier. When the first control channel is not detected on the reference carrier, it can be assumed that the mobile device is not scheduled. When the first control channel is detected, any other control channels, as well as the first control channel, are deemed valid.

Figure 10:
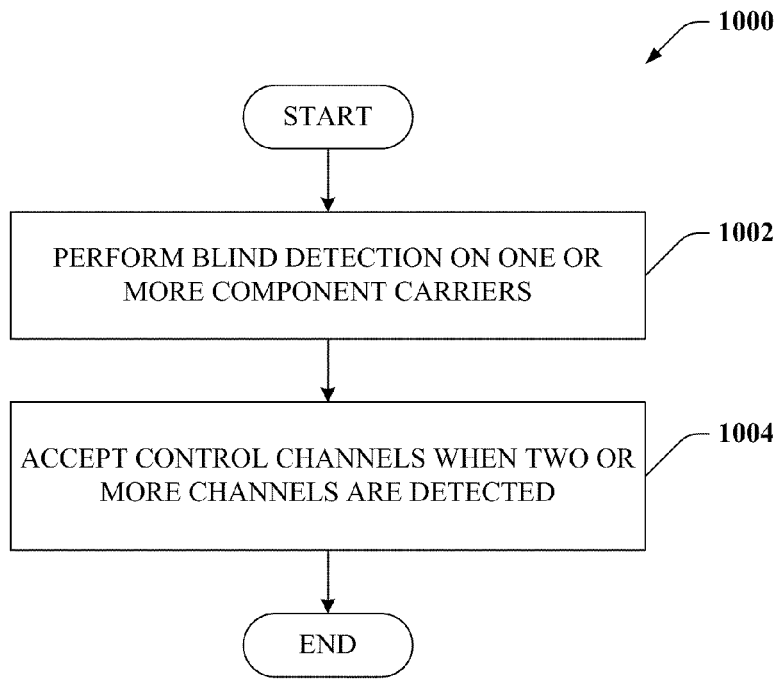
FIG. 10 is an illustration of an example methodology for detecting valid control channels when bundling is employed according to various aspects.

FIG. 10 illustrates a method 1000 for detecting valid control channels when bundling is employed according to various aspects. At reference numeral 1002, blind detection is performed on one or more carriers. At reference numeral 1004, control channels are accepted when two or more control channels on the one or more carriers are detected. In accordance with an aspect, one of the two or more control channels detected to achieve validity can be a dummy control channel as described supra.

Figure 11:
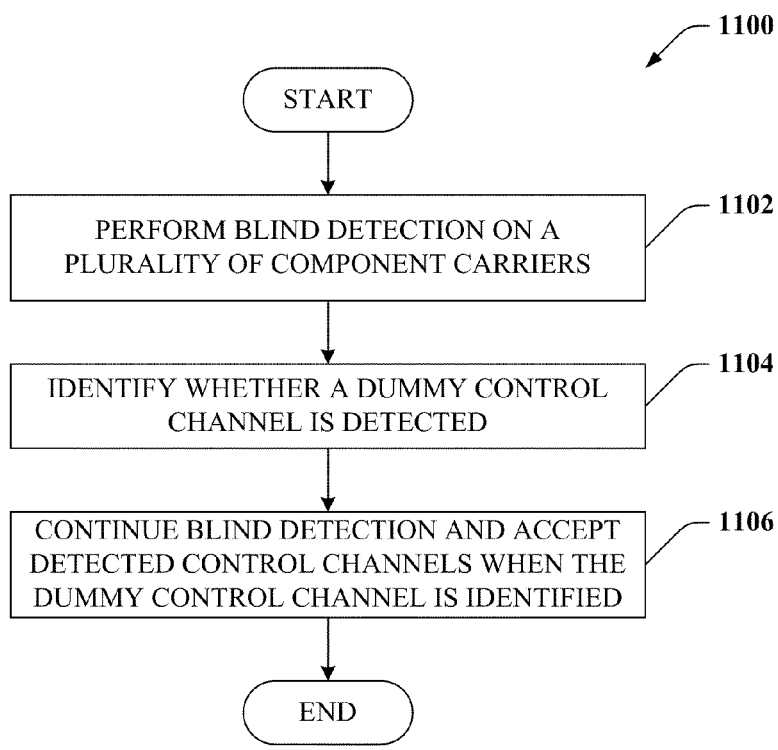
FIG. 11 is an illustration of an example methodology that facilitates blind detection of control channels through identification of a dummy channel in accordance with various aspects.

Referring now to FIG. 11, a method 1100 is depicted that facilitates blind detection of control channels through identification of a dummy channel in accordance with various aspects. Method 100 can be employed, for example, by a UE configured to implement a false detection reduction with dummy control channels. At reference numeral 1102, blind detection is performed on a plurality of component carriers. At reference numeral 1104, it is identified whether a dummy control channel is detected. The dummy control channel can be UE-specific and/or cell-specific, such that a location, size, and/or content of the dummy control channel can be known cell-wide or only to a specific UE. In an aspect, blind detection can commence at the location at which a dummy control channel, if present, would be located. At reference numeral 1106, blind detection can continue when the dummy control channel is identified. In addition, control channels, other than the dummy control channel, that are detected can be accepted as valid control channels.

Figure 12:
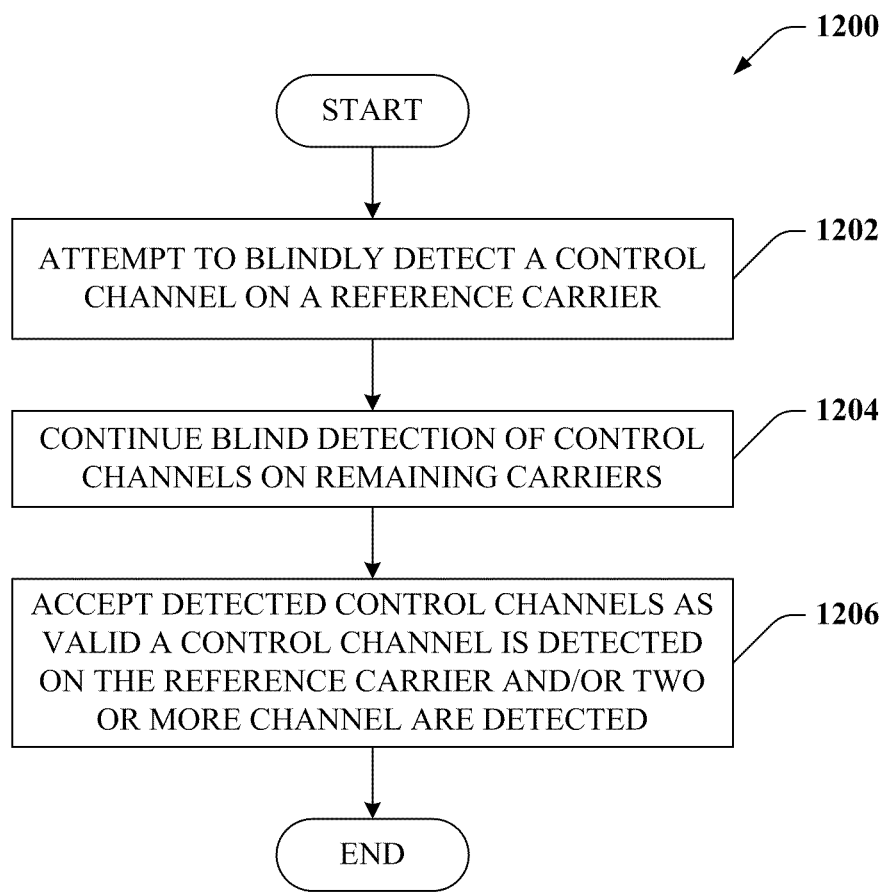
FIG. 12 is an illustration of an example methodology for detecting valid control channels in accordance with various aspects.

FIG. 12 depicts a method 1200 for detecting valid control channels in accordance with various aspects. Method 1200 can be implemented, for instance, by a UE configured to utilize control channel bundling, with or without dummy control channels, as a complement to a reference carrier. At reference numeral 1202, a blind detection of a control channel on a reference carrier can be attempted. At reference numeral 1204, blind detection can continue on remaining, non-reference, carriers. At reference numeral 1206, detected control channels can be accepted as valid when a control channel is detected on the reference carrier and/or two or more control channels are detected on non-reference carriers. It is to be appreciated that the two or more control channels detected on non-reference carriers can be all actual control channels, or can include a dummy control channel.

Figure 13:
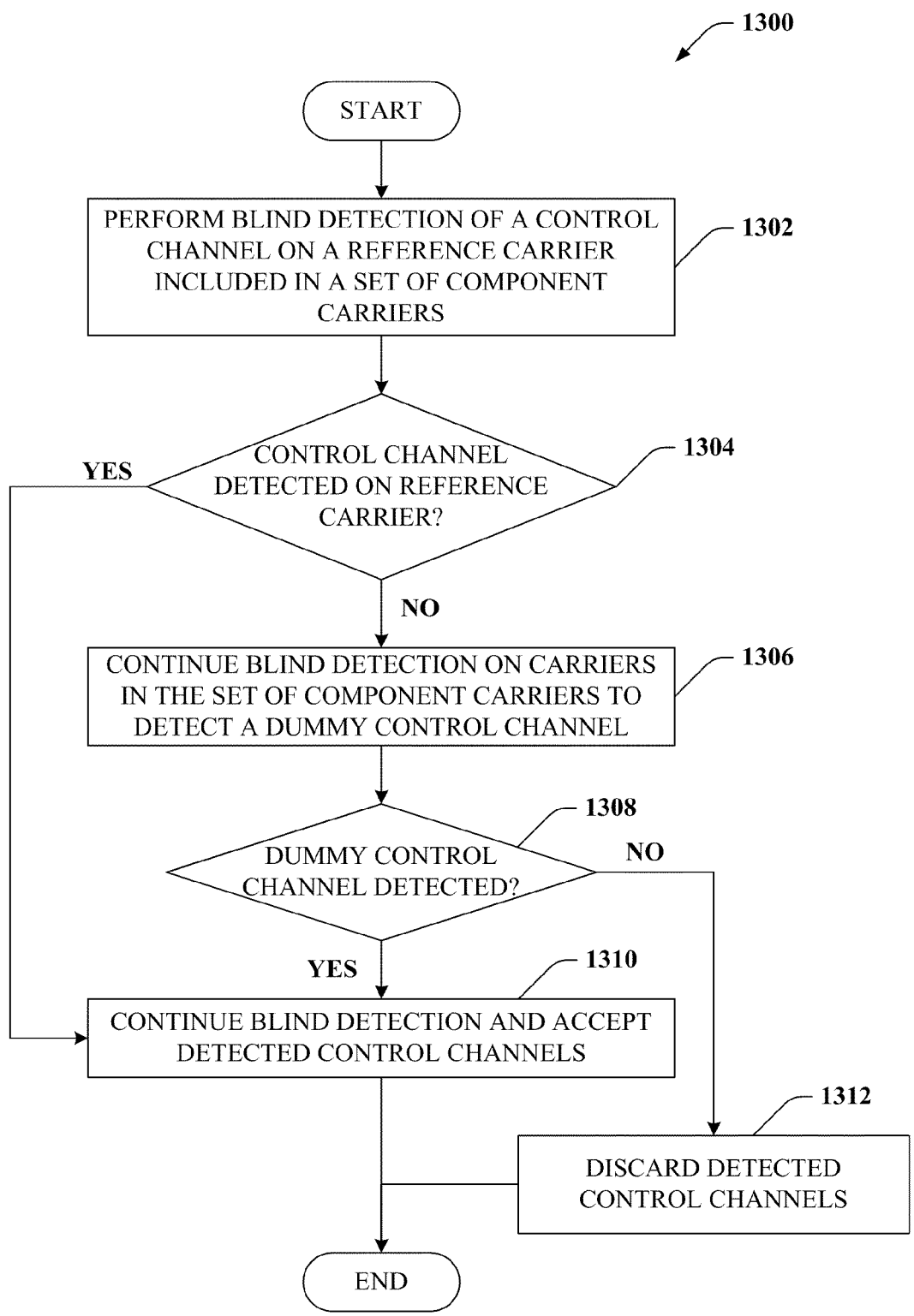
FIG. 13 is an illustration of an example methodology for performing blind detection in a multi-carrier system according to various aspects.

Turning to FIG. 13, illustrated is a method 1300 for performing blind detection in a multi-carrier system according to various aspects. At reference numeral 1302, blind detection of a control channel is performed on a reference carrier included in a set of component carriers. At reference 1304, it is determined whether a control channel is detected on the reference carrier. When a control channel is not detected on the reference carrier, method 1300 can proceed to reference numeral 1306 where blind detection continues on other, non-reference, carriers in the set of component carriers to detect a dummy control channel. At reference numeral 1308, it is determined whether the dummy control channel is detected. If yes at 1308 or a control channel is detected on the reference carrier at 1304, method 1300 proceeds to reference numeral 1310 where blind detection continues on remaining carriers and/or control channel candidates. Moreover, any detected controls are accepted as valid at reference numeral 1310. If, at reference numeral 1308, the dummy control channel is not detected, method 1300 proceeds to reference numeral 1312 where detected control channels are discarded.

Figure 14:
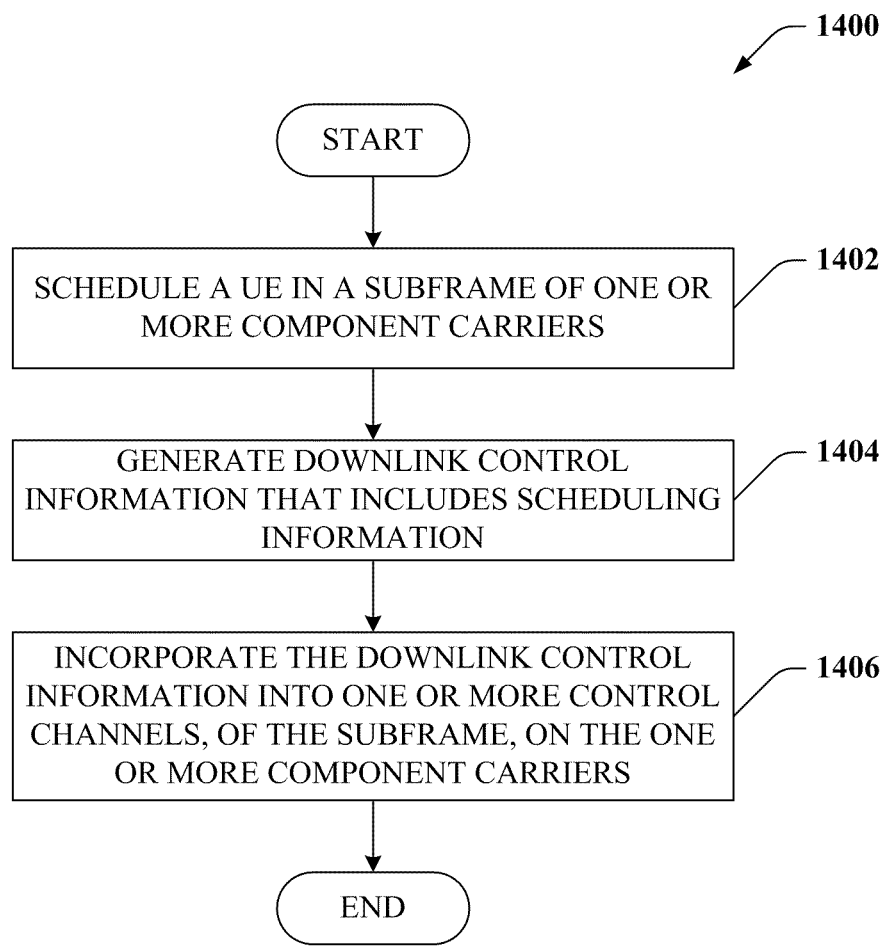
FIG. 14 is an illustration of an example methodology for scheduling a UE and conveying control information to the UE to reduce false detections in accordance with various aspects.

Referring now to FIG. 14, a method 1400 for scheduling a UE and conveying control information to the UE to reduce false detections in accordance with various aspects. Method 1400 can be employed, for example, by a base station to reduce false detections when served UEs are configured to monitor a plurality of component carriers. At reference numeral 1402, a UE, configured to monitor a plurality of component carriers, can be scheduled in a subframe of one or more component carries. At reference numeral 1404, downlink control information that includes scheduling information can be generated. In another aspect, dummy control channels can also be generated. At reference numeral 1406, the downlink control information and/or the dummy control channel can be incorporated into one or more control channels, of the subframe, on the one or more component carriers.

Scheduling the UE and/or incorporating the downlink control information into control channels can depend upon a false detection reduction mechanism employed. For example, when a reference carrier based approached is employed, a base station scheduled the UE at least on a reference carrier and the base station can incorporate a control channel on the reference carrier. Otherwise, the UE is not scheduled. Under a bundling approach, the UE is scheduled on two or more carriers such that two or more control channels are included in the subframe. When a dummy control channel approach is implemented, a dummy control channel is generated and transmitted in concert with an actual control channel. Thus, the dummy control channel validates the actual control channel. In another example, a combination of approaches can be employed.

It will be appreciated that, in accordance with one or more aspects described herein, inferences can be made regarding selecting a carrier to be designated as a reference carrier, selecting a mode of false detection reduction, implementing blind decoding, validating detected control channels, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 15:
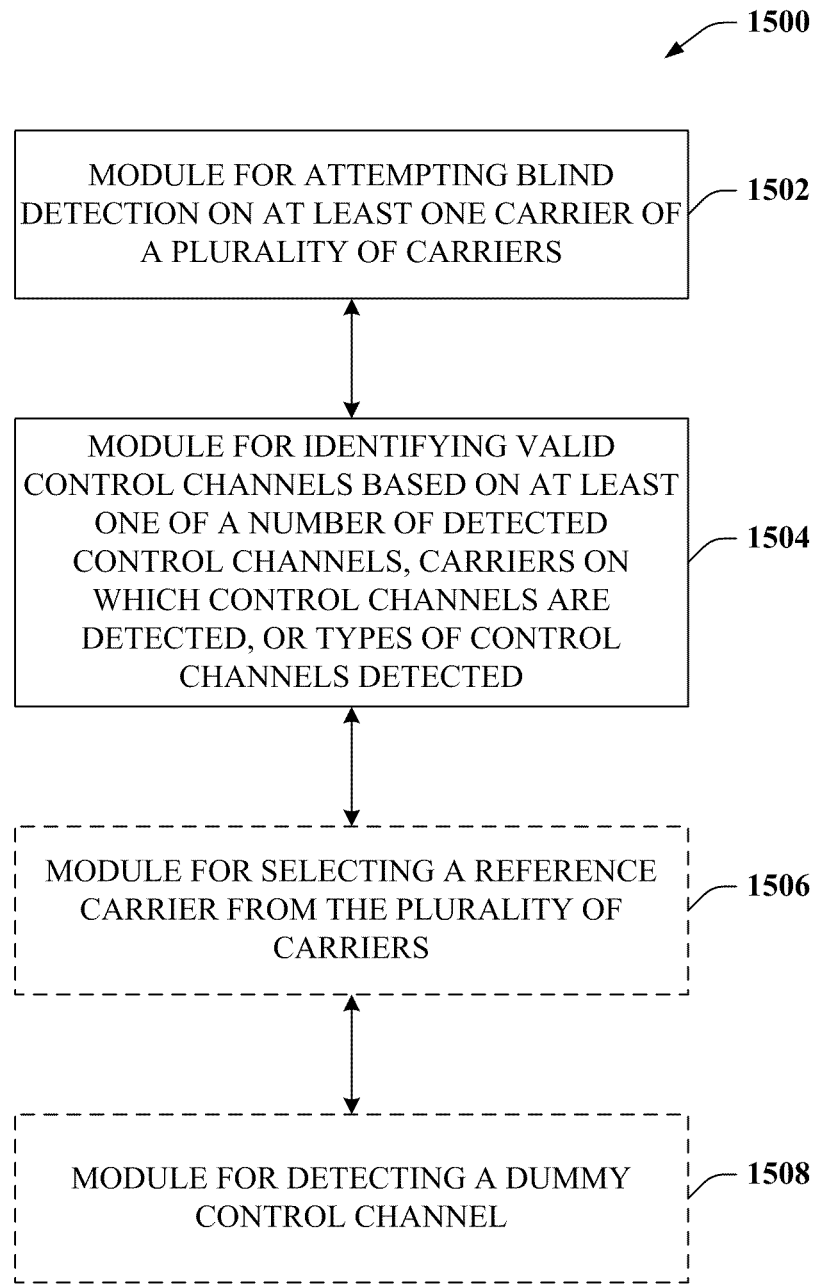
FIG. 15 is an illustration of an example apparatus that facilitates reducing false detection of control channel in multi-carrier configurations in accordance with various aspects.

Referring next to FIG. 15, an apparatus 1500 that facilitates reducing false detection of control channel in multi-carrier configurations is illustrated. It is to be appreciated that apparatus 1500 is represented as including functional blocks, which can be functional blocks that represent functions implemented by a processor, software, or combination thereof (e.g., firmware). Apparatus 1500 can be implemented by a user device (e.g., UE 120) and/or any other suitable network entity and can include a module 1502 for attempting blind detection on at least one carrier of a plurality of carriers, wherein blind detection attempts to detect a control channel on the at least one carrier, a module 1504 for identifying valid control channels based on at least one of a number of detected control channels, carriers on which control channels are detected, or types of control channels detected, an optional module 1506 for selecting a reference carrier from the plurality of carriers, wherein blind detection starts on the reference carrier, and an optional module 1508 for detecting a dummy control channel.

Figure 16:
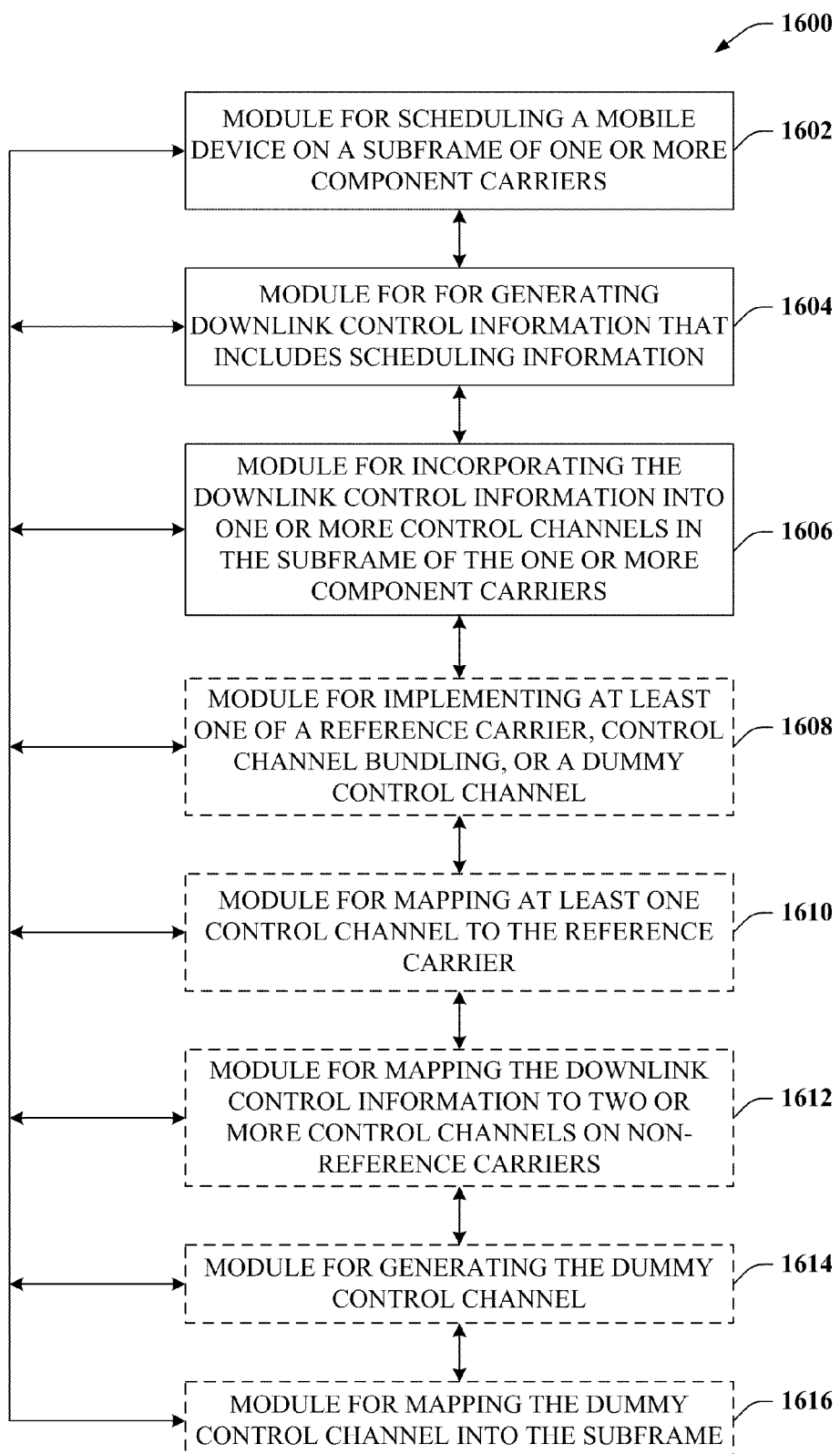
FIG. 16 is an illustration of an example apparatus that facilitates reducing false detection of control channel in multi-carrier configurations in accordance with various aspects.

Turning to FIG. 16, an apparatus 1600 that facilitates reducing false detection of control channel in multi-carrier configurations is illustrated. It is to be appreciated that apparatus 1600 is represented as including functional blocks, which can be functional blocks that represent functions implemented by a processor, software, or combination thereof (e.g., firmware). Apparatus 1600 can be implemented by a base station (e.g., eNB 110) and/or any other suitable network entity and can include a module 1602 for scheduling a mobile device on a subframe of one or more component carriers of a plurality of carriers, a module 1604 for generating downlink control information that includes scheduling information, a module 1606 for incorporating the downlink control information into one or more control channels in the subframe of the one or more component carriers, and an optional module 1608 for implementing at least one of a reference carrier, control channel bundling, or a dummy control channel. In addition, apparatus 1600 can include an optional module 1610 for mapping at least one control channel to the reference carrier, an optional module 1612 for mapping the downlink control information to two or more control channels on non-reference carriers, an optional module 1614 for generating the dummy control channel, and an optional module 1616 for mapping the dummy control channel into the subframe.

Figure 17:
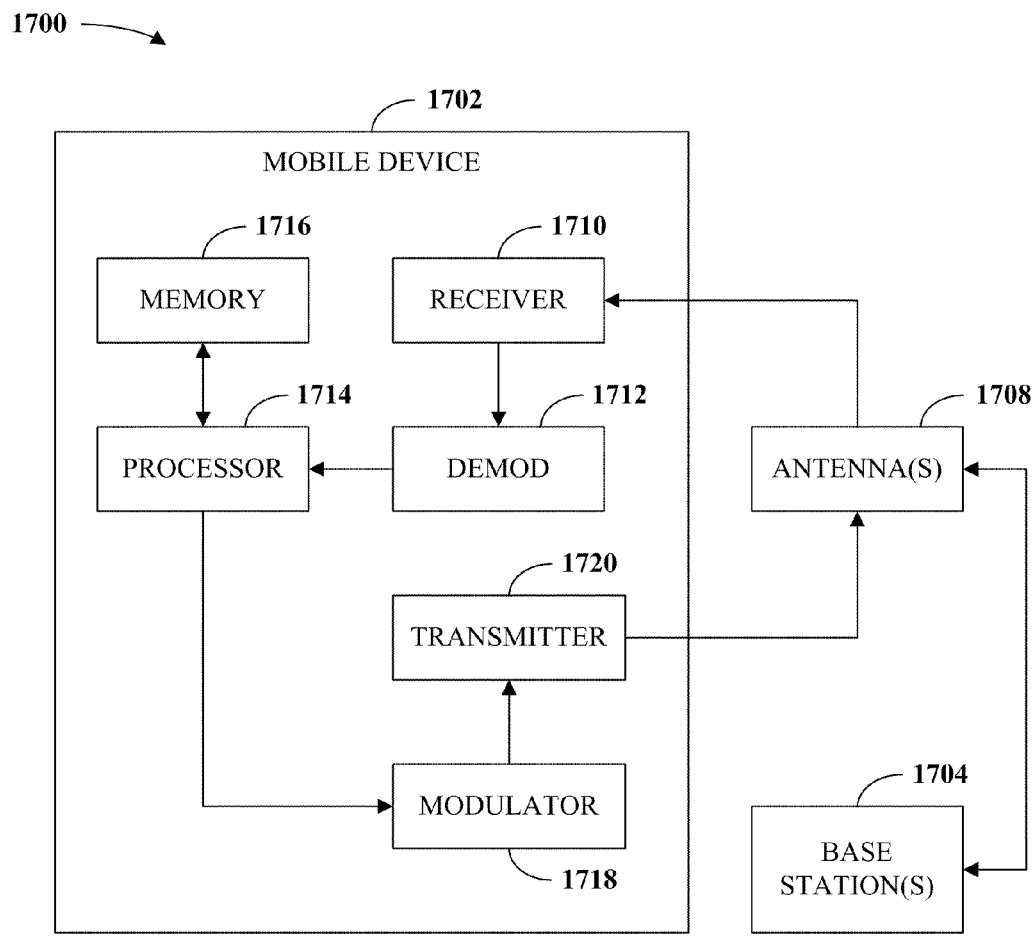
FIGS. 17-18 are block diagrams of respective wireless communication devices that can be utilized to implement various aspects of the functionality described herein.

FIG. 17 is a block diagram of another system 1700 that can be utilized to implement various aspects of the functionality described herein. In one example, system 1700 includes a mobile device 1702. As illustrated, mobile device 1702 can receive signal(s) from one or more base stations 1704 and transmit to the one or more base stations 1704 via one or more antennas 1708. Additionally, mobile device 1702 can comprise a receiver 1710 that receives information from antenna(s) 1708. In one example, receiver 1710 can be operatively associated with a demodulator (Demod) 1712 that demodulates received information. Demodulated symbols can then be analyzed by a processor 1714. Processor 1714 can be coupled to memory 1716, which can store data and/or program codes related to mobile device 1702. Mobile device 1702 can also include a modulator 1718 that can multiplex a signal for transmission by a transmitter 1720 through antenna(s) 1708.

Figure 18:
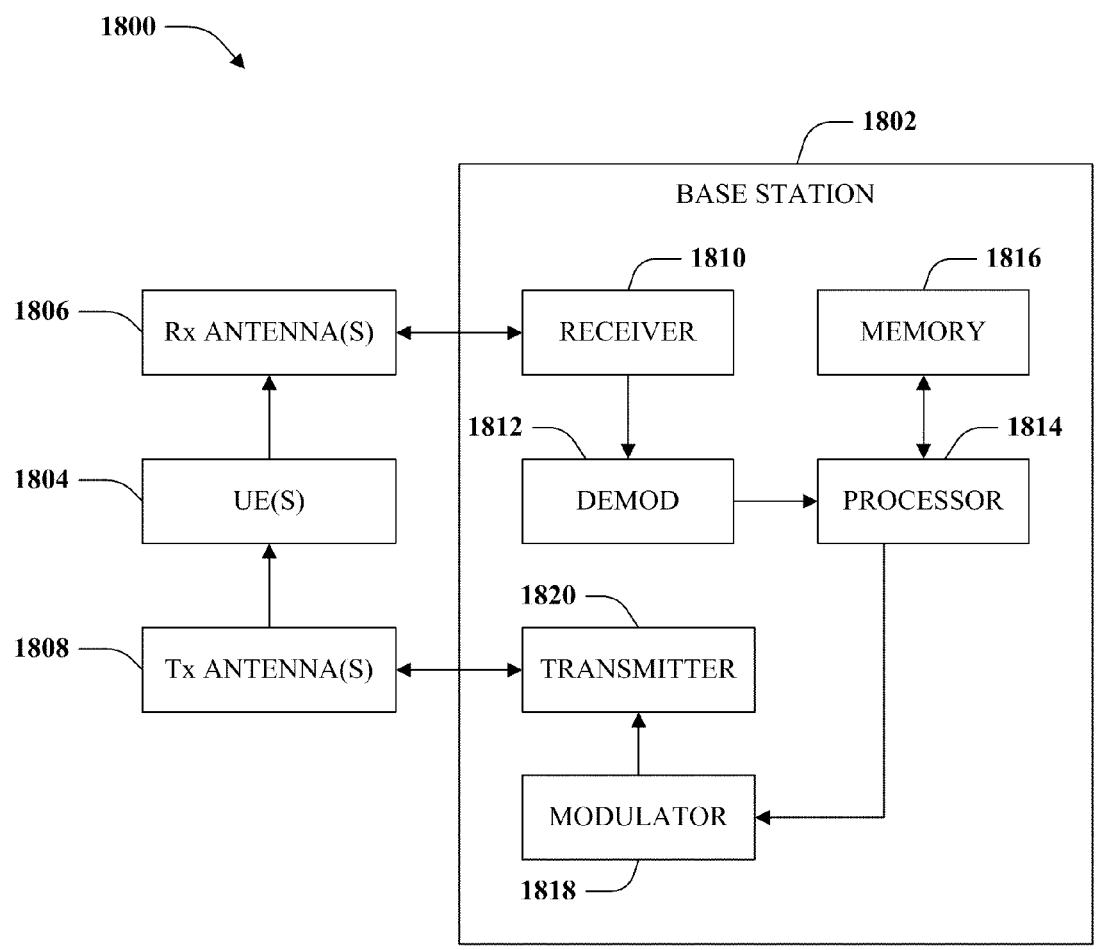

FIG. 18 is a block diagram of a system 1800 that can be utilized to implement various aspects of the functionality described herein. In one example, system 1800 includes a base station or base station 1802. As illustrated, base station 1802 can receive signal(s) from one or more UEs 1804 via one or more receive (Rx) antennas 1806 and transmit to the one or more UEs 1804 via one or more transmit (Tx) antennas 1808. Additionally, base station 1802 can comprise a receiver 1810 that receives information from receive antenna(s) 1806. In one example, the receiver 1810 can be operatively associated with a demodulator (Demod) 1812 that demodulates received information. Demodulated symbols can then be analyzed by a processor 1814. Processor 1814 can be coupled to memory 1816, which can store information related to code clusters, access terminal assignments, lookup tables related thereto, unique scrambling sequences, and/or other suitable types of information. Base station 1802 can also include a modulator 1818 that can multiplex a signal for transmission by a transmitter 1820 through transmit antenna(s) 1808.

Figure 19:
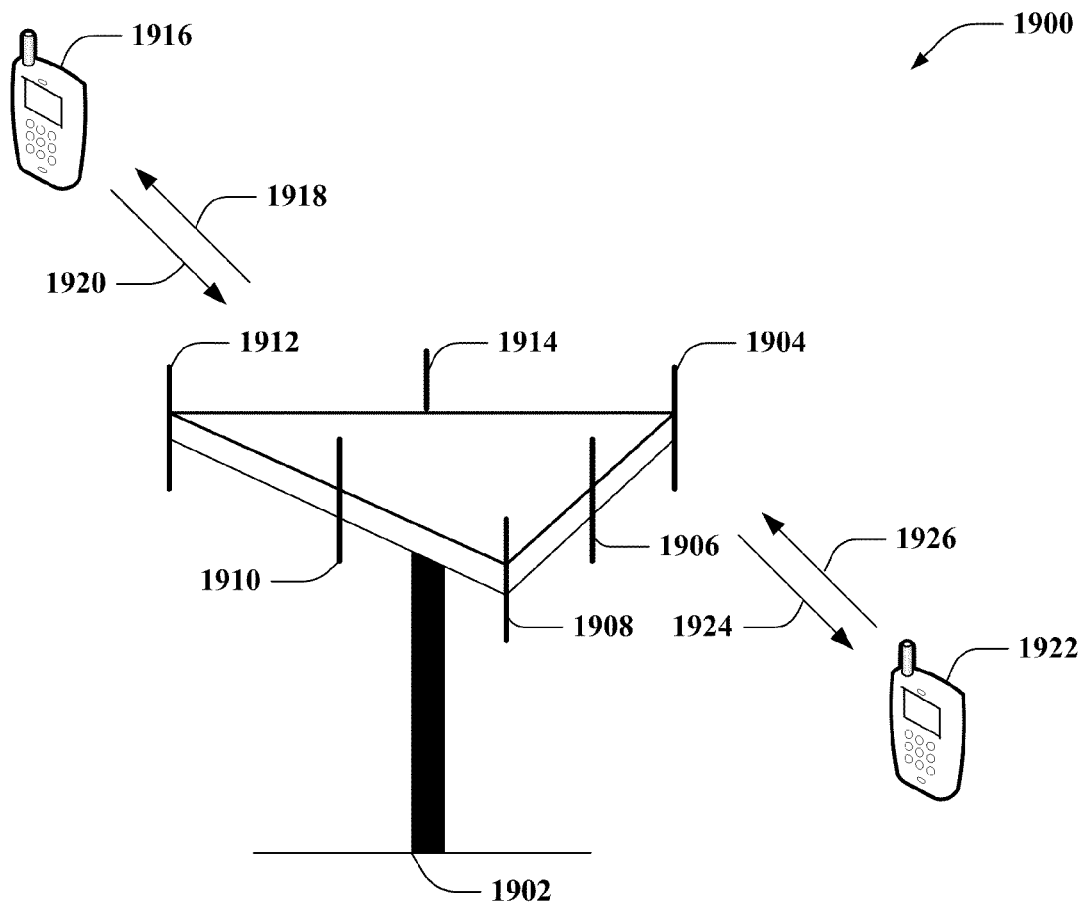
FIG. 19 is an illustration of a wireless communication system in accordance with various aspects set forth herein.

Referring now to FIG. 19, a wireless communication system 1900 is illustrated in accordance with various embodiments presented herein. System 1900 comprises a base station (e.g., access point) 1902 that can include multiple antenna groups. For example, one antenna group can include antennas 1904 and 1906, another group can comprise antennas 1908 and 1910, and an additional group can include antennas 1912 and 1914. Two antennas are illustrated for each antenna group; however, more or fewer antennas can be utilized for each group. Base station 1902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1902 can communicate with one or more UEs such as UE 1916 and UE 1922; however, it is to be appreciated that base station 1902 can communicate with substantially any number of UEs similar to UEs 1916 and 1922. UEs 1916 and 1922 can be, for example, cellular phones, smart phones, laptops, handheld communication devices, handheld computing devices, satellite radios, global positioning systems, PDAs, and/or any other suitable device for communicating over wireless communication system 1900. As depicted, UE 1916 is in communication with antennas 1912 and 1914, where antennas 1912 and 1914 transmit information to UE 1916 over a downlink 1918 and receive information from UE 1916 over an uplink 1920. Moreover, UE 1922 is in communication with antennas 1904 and 1906, where antennas 1904 and 1906 transmit information to UE 1922 over a downlink 1924 and receive information from UE 1922 over an uplink 1926. In a frequency division duplex (FDD) system, downlink 1918 can utilize a different frequency band than that used by uplink 1920, and downlink 1924 can employ a different frequency band than that employed by uplink 1926, for example. Further, in a time division duplex (TDD) system, downlink 1918 and uplink 1920 can utilize a common frequency band and downlink 1924 and uplink 1926 can utilize a common frequency band.

Each group of antennas and/or the area in which they are designated to communicate can be referred to as a sector of base station 1902. For example, antenna groups can be designed to communicate to UEs in a sector of the areas covered by base station 1902. In communication over downlinks 1918 and 1924, the transmitting antennas of base station 1902 can utilize beamforming to improve signal-to-noise ratio of downlinks 1918 and 1924 for UEs 1916 and 1922. Also, while base station 1902 utilizes beamforming to transmit to UEs 1916 and 1922 scattered randomly through an associated coverage, UEs in neighboring cells can be subject to less interference as compared to a base station transmitting through a single antenna to all its UEs. Moreover, UEs 1916 and 1922 can communicate directly with one another using a peer-to-peer or ad hoc technology (not shown).

According to an example, system 1900 can be a multiple-input multiple-output (MIMO) communication system. Further, system 1900 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1902 can communicate to the UEs 1916 and 1922 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 20:
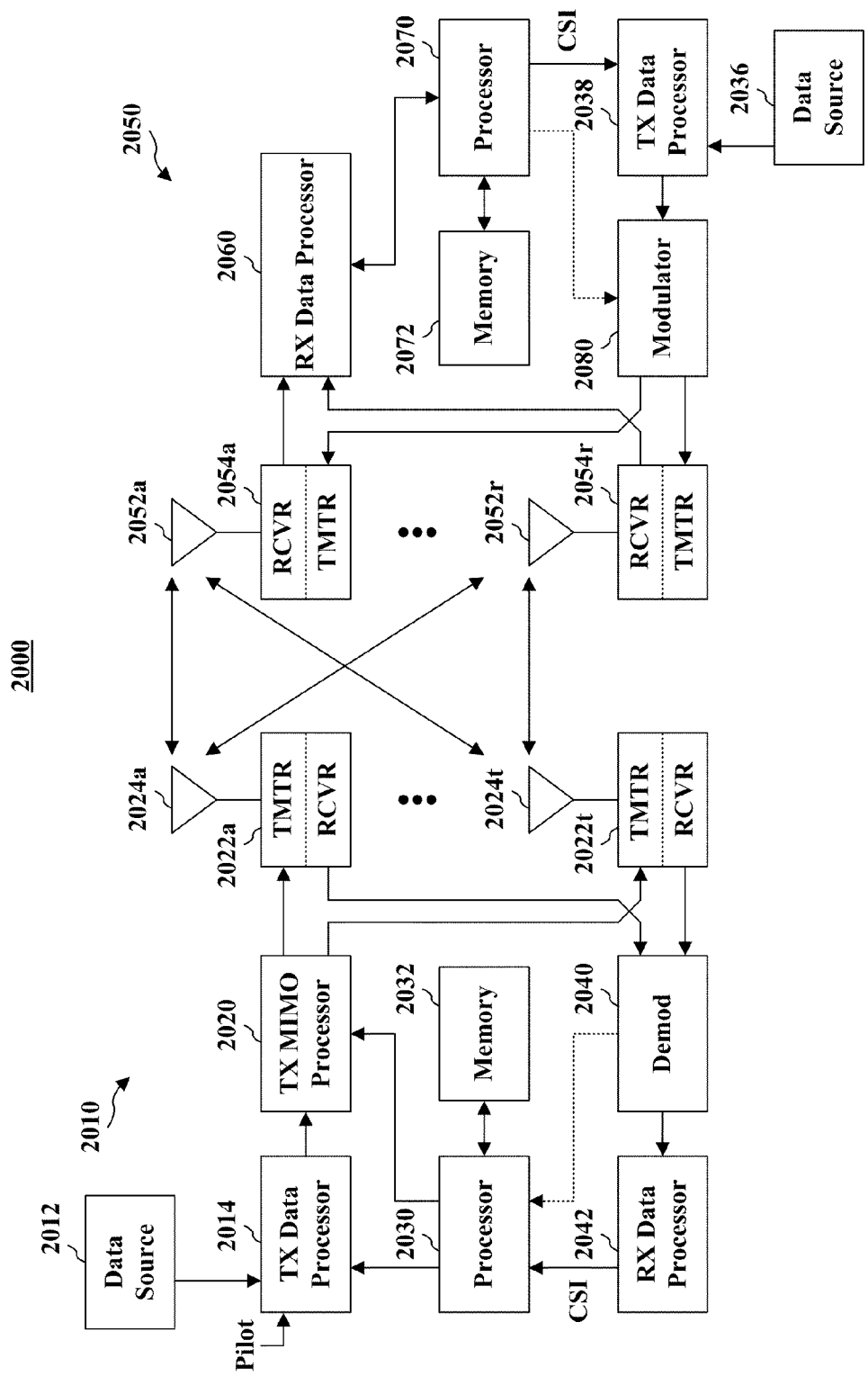
FIG. 20 is a block diagram illustrating an example wireless communication system in which various aspects described herein can function.

FIG. 20 shows an example wireless communication system 2000. The wireless communication system 2000 depicts one base station 2010 and one access terminal 2050 for sake of brevity. However, it is to be appreciated that system 2000 can include more than one base station and/or more than one access terminal, wherein additional base stations and/or access terminals can be substantially similar or different from example base station 2010 and access terminal 2050 described below. In addition, it is to be appreciated that base station 2010 and/or access terminal 2050 can employ the systems (FIGS. 1, 6, 7, and 15-16) and/or method (FIGS. 8-14) described herein to facilitate wireless communication there between.

At base station 2010, traffic data for a number of data streams is provided from a data source 2012 to a transmit (TX) data processor 2014. According to an example, each data stream can be transmitted over a respective antenna. TX data processor 2014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 2050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 2030.

The modulation symbols for the data streams can be provided to a TX MIMO processor 2020, which can further process the modulation symbols (e.g., for OFDM). TX MIMO processor 2020 then provides $N_T$ modulation symbol streams to $N_T$ transmitters (TMTR) 2022a through 2022t. In various embodiments, TX MIMO processor 2020 applies beamforming weights to the symbols of the data streams and to the antenna from which the symbol is being transmitted.

Each transmitter 2022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 2022a through 2022t are transmitted from $N_T$ antennas 2024a through 2024t, respectively.

At access terminal 2050, the transmitted modulated signals are received by $N_R$ antennas 2052a through 2052r and the received signal from each antenna 2052 is provided to a respective receiver (RCVR) 2054a through 2054r. Each receiver 2054 conditions (e.g., filters, amplifies, and downconverts) a respective signal, digitizes the conditioned signal to provide samples, and further processes the samples to provide a corresponding "received" symbol stream.

An RX data processor 2060 can receive and process the $N_R$ received symbol streams from $N_R$ receivers 2054 based on a particular receiver processing technique to provide $N_T$ "detected" symbol streams. RX data processor 2060 can demodulate, deinterleave, and decode each detected symbol stream to recover the traffic data for the data stream. The processing by RX data processor 2060 is complementary to that performed by TX MIMO processor 2020 and TX data processor 2014 at base station 2010.

A processor 2070 can periodically determine which available technology to utilize as discussed above. Further, processor 2070 can formulate a reverse link message comprising a matrix index portion and a rank value portion.

The reverse link message can comprise various types of information regarding the communication link and/or the received data stream. The reverse link message can be processed by a TX data processor 2038, which also receives traffic data for a number of data streams from a data source 2036, modulated by a modulator 2080, conditioned by transmitters 2054a through 2054r, and transmitted back to base station 2010.

At base station 2010, the modulated signals from access terminal 2050 are received by antennas 2024, conditioned by receivers 2022, demodulated by a demodulator 2040, and processed by a RX data processor 2042 to extract the reverse link message transmitted by access terminal 2050. Further, processor 2030 can process the extracted message to determine which precoding matrix to use for determining the beamforming weights.

Processors 2030 and 2070 can direct (e.g., control, coordinate, manage, etc.) operation at base station 2010 and access terminal 2050, respectively. Respective processors 2030 and 2070 can be associated with memory 2032 and 2072 that store program codes and data. Processors 2030 and 2070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
performing blind detection on two or more component carriers of a plurality of component carriers, wherein the blind detection attempts to detect a control channel on the two or more component carriers;
identifying a plurality of control channel detections from performing the blind detection on the two or more component carriers and a component carrier identity respectively associated with each control channel detection; and
determining whether to accept the detected control channels from the blind detection on the two or more component carriers based on at least one of the plurality of control channel detections or the component carrier identity.

2. The method of claim 1, further comprising:
designating a component carrier of the plurality of component carriers as a reference carrier; and
accepting the detected control channels when the component carrier identity, associated with a control channel detection, indicates the reference carrier.

3. The method of claim 2, wherein the reference carrier is designated in a configuration message.

4. The method of claim 2, wherein the reference carrier is dynamically selected based upon at least one of a user equipment (UE) identifier, a cell identifier, a subframe number, a system frame number, or a hybrid-ARQ process number.

5. The method of claim 2, wherein each component carrier in the plurality of component carriers rotates being the reference carrier, wherein each component carrier functions as the reference carrier after a predetermined number of subframes.

6. The method of claim 2, further comprising:
validating the detected control channels when the number of control channel detections indicates two or more detections and respective component carrier identities indicate non-reference carriers.

7. The method of claim 6, wherein one of the two or more detections is a dummy control channel.

8. A method, comprising:
performing blind detection on at least one component carrier of a plurality of component carriers, wherein the blind detection attempts to detect a control channel on the at least one component carrier;
identifying a number of control channel detections and a component carrier identity respectively associated with each control channel detection;
determining whether to accept detected control channels based on at least one of the number of control channel detections or the component carrier identity;
designating a component carrier of the plurality of component carriers as a reference carrier;
accepting detected control channels when the component carrier identity, associated with a control channel detection, indicates the reference carrier;
executing blind detection on the reference carrier;
searching for a dummy control channel when control channels are not found on the reference carrier; and
continuing blind detection on non-reference carriers when the dummy control channel is detected.

9. The method of claim 1, further comprising accepting detected control channels when the number of control channel detections indicates two or more detections.

10. The method of claim 9, wherein one of the two or more detections is a dummy control channel.

11. The method of claim 1, further comprising:
searching for a dummy control channel on the plurality of component carriers; and
accepting control channel detections when the dummy control channel is discovered.

12. The method of claim 11, wherein the dummy control channel includes a parameter specifying a number of component carriers on which a UE is scheduled.

13. The method of claim 11, wherein the dummy control channel includes a bitmap that indicates, for each UE of a plurality of UEs, whether the UE is scheduled.

14. A wireless communications apparatus, comprising:
at least one processor configured to:
perform blind detection on a plurality of component carriers, wherein the blind detection attempts to decode a plurality of candidate control channels to detect a plurality of control channels on the plurality of component carriers; and
accept the detected plurality of control channels from the blind detection on the plurality of component carriers when at least one of a control channel is detected on a reference carrier, two or more control channels are detected on non-reference carriers, or a dummy control channel is detected with a non-dummy control channel.

15. The wireless communications apparatus of claim 14, wherein the at least one processor is further configured to:
designate the reference carrier from among the plurality of component carriers; and
commence blind detection from the reference carrier.

16. The wireless communications apparatus of claim 14, wherein the at least one processor is further configured to search for the dummy control channel on the plurality of component carriers.

17. The wireless communications apparatus of claim 16, wherein the at least one processor is further configured to evaluate the dummy control channel to determine whether the wireless communications apparatus is scheduled on a subframe.

18. An apparatus, comprising:
means for attempting blind detection on a plurality of component carriers, wherein the blind detection attempts to detect control channels on the plurality of component carrier; and
means for identifying valid control channels based on at least one of a plurality of detected control channels, carriers on which control channels are detected, or types of control channels detected.

19. The apparatus of claim 18, further comprising means for selecting a reference carrier from the plurality of component carriers, wherein the blind detection starts on the reference carrier.

20. The apparatus of claim 19, wherein the means for identifying valid control channels accepts the detected control channels when at least one control channel is detected on the reference carrier.

21. The apparatus of claim 18, further comprising:
means for detecting a dummy control channel, wherein detection of the dummy control channel validates other control channel detections.

22. The apparatus of claim 18, wherein the means for identifying valid control channels accepts the detected control channels when two or more control channels are detected.

23. The apparatus of claim 22, wherein the two or more control channels are associated with non-reference carriers.

24. The apparatus of claim 22, wherein one of the two or more control channels is a dummy control channel.

25. A computer program product, comprising:
   a non-transitory computer-readable medium, comprising:
      code for causing at least one computer to implement blind detection on a plurality of component carriers, wherein the blind detection attempts to decode a plurality of candidate control channels to detect a plurality of control channels on the plurality of component carriers; and
      code for causing the at least one computer to validate detected control channels when at least one of a control channel is detected on a reference carrier, two or more control channels are detected on non-reference carriers, or a dummy control channel is detected with a non-dummy control channel.

26. The computer program product of claim 25, wherein the computer-readable medium further comprises:
   code for causing the at least one computer to select the reference carrier from among the plurality of component carriers; and
   code for causing the at least one computer to initiate the blind detection from the reference carrier.

27. The computer program product of claim 25, wherein the computer-readable medium further comprises code for causing the at least one computer to search for the dummy control channel on the plurality of component carriers.

28. The computer program product of claim 27, wherein the computer-readable medium further comprises code for causing the at least one computer to evaluate the dummy control channel to determine whether a mobile device is scheduled on a subframe.

29. An apparatus, comprising:
   a detection module that performs blind detection of a plurality of control channels on a plurality of component carriers; and
   a validity evaluation module that determines whether detected control channels from the blind detection of the plurality of control channels on the plurality of component carriers are valid control channels.

30. The apparatus of claim 29, further comprising a carrier configuration module that selects a reference carrier from the plurality of component carriers.

31. The apparatus of claim 30, wherein the validity evaluation module validates the detected control channels when at least one control channel is on the reference carrier.

32. The apparatus of claim 29, wherein the validity evaluation module validates the detected control channels when two or more control channels are detected.

33. The apparatus of claim 32, wherein the two or more control channels are associated with non-reference carriers.

34. The apparatus of claim 29, wherein the detection module is configured to detect a dummy control channel.

35. The apparatus of claim 34, wherein the validity evaluation module validates a control channel when detected in combination with the dummy control channel.

36. A method, comprising:
   scheduling a mobile device on a subframe of two or more component carriers of a plurality of component carriers;
   generating downlink control information that includes scheduling information; and
   incorporating the downlink control information for blind detection into two or more control channels in the subframe of the two or more component carriers, wherein incorporating the downlink control information comprises implementing at least one of a reference carrier, control channel bundling, or a dummy control channel.

37. The method of claim 36, further comprising transmitting a configuration message which designates the reference carrier from the plurality of carriers.

38. The method of claim 36, wherein incorporating the downlink control information comprises mapping at least one control channel to the reference carrier.

39. The method of claim 36, wherein incorporating the downlink control information comprises incorporating the downlink control information to two or more control channels on non-reference carriers.

40. The method of claim 36, further comprising:
   generating the dummy control channel; and
   incorporating the dummy control channel into the subframe.

41. The method of claim 36, wherein the dummy control channel includes a parameter specifying a number of component carriers on which the mobile device is scheduled.

42. The method of claim 36, wherein the dummy control channel include a bitmap that indicates, for each UE of a plurality of UEs, whether the UE is scheduled.

43. A wireless communications apparatus, comprising:
   at least one processor configured to:
      schedule a mobile device on a subframe of two or more component carriers of a plurality of component carriers;
      generate downlink control information that includes scheduling information; and
      map the downlink control information for blind detection into two or more control channels in the subframe of the two or more component carriers through implementation of at least one of a reference carrier, control channel bundling, or a dummy control channel.

44. The wireless communications apparatus of claim 43, wherein the at least one processor is further configured to send a configuration message which designates the reference carrier from the plurality of carriers.

45. The wireless communications apparatus of claim 43, wherein the at least one processor is further configured to incorporate the downlink control information to a control channel on the reference carrier.

46. The wireless communications apparatus of claim 43, wherein the at least one processor is further configured to incorporate the downlink control information to two or more control channels on non-reference carriers.

47. The wireless communications apparatus of claim 43, wherein the at least one processor is further configured to:
   generate the dummy control channel; and
   incorporate the dummy control channel into the subframe in addition to the two or more control channels.

48. An apparatus, comprising:
   means for scheduling a mobile device on a subframe of two or more component carriers of a plurality of component carriers;
   means for generating downlink control information that includes scheduling information; and
   means for incorporating the downlink control information for blind detection into two or more control channels in the subframe of the two or more component carriers, wherein the means for incorporating the downlink control information comprises means for implementing at least one of a reference carrier, control channel bundling, or a dummy control channel.

49. The apparatus of claim 48, wherein the means for incorporating the downlink control information comprises means for mapping at least one control channel to the reference carrier.

50. The apparatus of claim 48, wherein the means for incorporating the downlink control information comprises means for mapping the downlink control information to two or more control channels on non-reference carriers.

51. The apparatus of claim 48, further comprising:
means for generating the dummy control channel; and
means for mapping the dummy control channel into the subframe.

52. A computer program product, comprising:
a non-transitory computer-readable medium, comprising:
code for causing at least one computer to schedule a mobile device on a subframe of two or more component carriers of a plurality of component carriers;
code for causing the at least one computer to generate downlink control information that includes scheduling information; and
code for causing the at least one computer to map the downlink control information for blind detection into two or more control channels in the subframe of the two or more component carriers through implementation of at least one of a reference carrier, control channel bundling, or a dummy control channel.

53. The computer program product of claim 52, wherein the computer-readable medium further comprises code for causing the at least one computer to incorporate the downlink control information to a control channel on the reference carrier.

54. The computer program product of claim 52, wherein the computer-readable medium further comprises code for causing the at least one computer to incorporate the downlink control information to two or more control channels on non-reference carriers.

55. The computer program product of claim 52, wherein the computer-readable medium further comprises:
code for causing the at least one computer to generate the dummy control channel; and
code for causing the at least one computer to incorporate the dummy control channel into the subframe in addition to the two or more control channels.

56. An apparatus, comprising:
a control channel module that integrates scheduling information into a downlink control information format for blind detection;
a reference carrier module that maps a first downlink control information packet to a reference carrier for blind detection;
a dummy generation module that provides a dummy control channel for blind detection; and
a bundling module that groups two or more control channels onto non-reference carriers for blind detection.

57. The apparatus of claim 56, further comprising a scheduler that schedules a mobile device on a subframe of one or more component carriers of a plurality of carriers.

58. The apparatus of claim 56, further comprising a carrier configuration module that at least one of activates or deactivates component carriers monitored by a mobile device.

59. The apparatus of claim 56, further comprising a signaling configuration module that selects a mode of false detection reduction, wherein the control channel module employs at least one of the reference carrier module, the dummy generation module, or the bundling module based upon the mode of false detection reduction.

* * * * *